(12) United States Patent
Liu et al.

(10) Patent No.: US 12,517,204 B2
(45) Date of Patent: Jan. 6, 2026

(54) SYSTEMS AND METHODS FOR MAGNETIC RESONANCE IMAGING

(71) Applicant: SHANGHAI UNITED IMAGING HEALTHCARE CO., LTD., Shanghai (CN)

(72) Inventors: Liu Liu, Shanghai (CN); Jian Xu, Houston, TX (US); Tingrong Shi, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 202 days.

(21) Appl. No.: 18/450,381

(22) Filed: Aug. 15, 2023

(65) Prior Publication Data

US 2024/0053421 A1    Feb. 15, 2024

(30) Foreign Application Priority Data

Aug. 15, 2022 (CN) .......................... 202210977070.7

(51) Int. Cl.
     *G01V 3/00*          (2006.01)
     *G01R 33/483*      (2006.01)
     *G01R 33/54*       (2006.01)

(52) U.S. Cl.
     CPC ......... *G01R 33/543* (2013.01); *G01R 33/483* (2013.01)

(58) Field of Classification Search
     CPC .............. G01R 33/5608; G01R 33/385; G01R 33/4824; G01R 33/4828; G01R 33/50; G01R 33/561; A61B 5/4312; A61B 5/004

USPC ......................................................... 324/309
See application file for complete search history.

(56) References Cited

U.S. PATENT DOCUMENTS

| | | | |
|---|---|---|---|
| 10,251,627 B2* | 4/2019 | Parthasarathy | A61B 8/469 |
| 2010/0040268 A1* | 2/2010 | Boeing | A61B 6/482 |
| | | | 382/128 |
| 2019/0336005 A1* | 11/2019 | Alford | A61B 5/4064 |

FOREIGN PATENT DOCUMENTS

| | | | | |
|---|---|---|---|---|
| CN | 101421637 A | * | 4/2009 | ....... G01R 33/56375 |
| CN | 108922600 A | * | 11/2018 | ............ G16H 30/20 |
| CN | 111445990 A | * | 7/2020 | |
| CN | 111813270 A | * | 10/2020 | ......... G06F 3/04166 |
| CN | 112116575 A | * | 12/2020 | ........... G06T 7/0012 |

(Continued)

*Primary Examiner* — Walter L Lindsay, Jr.
*Assistant Examiner* — Frederick Wenderoth
(74) *Attorney, Agent, or Firm* — METIS IP LLC

(57) ABSTRACT

Systems and methods for MRI are provided. The systems obtain a reference MR image of a target subject. The reference MR image is acquired by performing a reference MR scan on a first anatomical structure of the target subject before a target MR scan. The target MR scan is to be performed on a second anatomical structure of the target subject. The second anatomical structure is smaller than the first anatomical structure. The systems determine geometrical information of the second anatomical structure based on the reference MR image. The systems determine a target scanning protocol with respect to the target MR scan based on the geometrical information. The systems acquire a target MR image of the second anatomical structure by performing the target scan based on the target scanning protocol. In the target MR image, the second anatomical structure is not overlapped with other anatomical structures of the target subject.

20 Claims, 14 Drawing Sheets

(56) References Cited

FOREIGN PATENT DOCUMENTS

WO     WO-2012154260 A2 * 11/2012 ............. A61B 5/055

* cited by examiner

SYSTEMS AND METHODS FOR MAGNETIC RESONANCE IMAGING

CROSS-REFERENCE TO RELATED APPLICATIONS

This application claims priority to Chinese Patent Application No. 202210977070.7 filed on Aug. 15, 2022, the entire contents of which are hereby incorporated by reference.

TECHNICAL FIELD

The present disclosure generally relates to medical imaging, and more particularly, relates to systems and methods for magnetic resonance imaging (MRI).

BACKGROUND

A medical device (e.g., a magnetic resonance (MR) scanner) is often used to scan a target subject within a certain field of view (FOV) to obtain a medical image (e.g., an MR image) of the target subject. In order to reduce overlap (also referred to as wrap around artifacts) between different anatomical structures of the target subject in the medical image, the scan of the target subject is usually performed in an FOV with a relatively large size, which increases a number of phase encodings and scanning time of the scan, thus reducing the imaging speed and the imaging efficiency. Therefore, it is desirable to provide systems and methods for MRI to improve the imaging speed and the imaging efficiency.

SUMMARY

An aspect of the present disclosure relates to a method for MRI. The method is implemented on a computing device including at least one processor and at least one storage device. The method may include obtaining a reference MR image of a target subject. The reference MR image may be acquired by performing a reference MR scan on a first anatomical structure of the target subject before a target MR scan. The target MR scan may be to be performed on a second anatomical structure of the target subject. The second anatomical structure may be smaller than the first anatomical structure. The method may include determining geometrical information of the second anatomical structure based on the reference MR image. The method may include determining a target scanning protocol with respect to the target MR scan based on the geometrical information. The method may include acquiring a target MR image of the second anatomical structure by performing the target scan based on the target scanning protocol. In the target MR image, the second anatomical structure may be not overlapped with other anatomical structures of the target subject.

In some embodiments, the target MR scan may be a 2-dimensional multi-layer MR scan directed to multiple scanning layers. The determining, based on the reference MR image of the target subject, the geometrical information of the second anatomical structure of the target subject may include for each of the multiple scanning layers, generating a multiple planar reconstruction (MPR) image based on position information of the scanning layer and the reference MR image of the target subject; and determining the geometrical information of the second anatomical structure of the target subject based on MPR images corresponding to the multiple scanning layers.

In some embodiments, the geometrical information of the second anatomical structure of the target subject may include at least one of lengths of the second anatomical structure in multiple preset directions, or position information of a geometric center or a geometric center of gravity of the second anatomical structure.

In some embodiments, the determining the target scanning protocol with respect to the target MR scan based on the geometrical information of the second anatomical structure of the target subject may include determining a phase encoding (PE) direction of the target scan based on the lengths of the second anatomical structure in the multiple preset directions.

In some embodiments, the determining the PE direction of the target scan based on the lengths of the second anatomical structure in the multiple preset directions may include determining whether artifacts will occur in the target MR image; in response to determining that artifacts will occur in the target MR image, determining the PE direction of the target scan based on the artifacts that will occur in the target MR image; and in response to determining that no artifacts will occur in the target MR image, designating a preset direction corresponding to the shortest length among the lengths of the second anatomical structure in the multiple preset directions as the PE direction of the target scan.

In some embodiments, the determining the target scanning protocol with respect to the target MR scan based on the geometrical information of the second anatomical structure of the target subject may include determining a size of a field of view (FOV) of the target scan based on the lengths of the second anatomical structure in the multiple preset directions.

In some embodiments, the determining the target scanning protocol with respect to the target MR scan based on the geometrical information of the second anatomical structure of the target subject may include determining a center of the FOV of the target scan based on the position information of the geometric center or the geometric center of gravity of the second anatomical structure.

In some embodiments, the determining the target scanning protocol with respect to the target MR scan may include determining a reference region in the reference MR image or an MRP image corresponding to each scanning layer of the target MR scan, wherein a length of the reference region in a readout (RO) direction is equal to a length of the FOV in the RO direction, and a center coordinate of the reference region in the RO direction is equal to a center coordinate of the center of the FOV in the RO direction; determining a length of the target subject in the reference region in a PE direction; and determining a degree of oversampling in the PE direction based on the length of the target subject in the reference region in the PE direction and a length of the FOV in the PE direction.

In some embodiments, the determining the target scanning protocol with respect to the target MR scan may include determining a number of PE steps in the PE direction based on the length of the FOV in the PE direction and the degree of oversampling in the PE direction.

In some embodiments, the acquiring the target MR image of the second anatomical structure of the target subject by performing the target scan based on the target scanning protocol may include instructing a terminal to display information relating to the target scanning protocol; modifying the target scanning protocol based on a modification command received from the terminal; and acquiring the target MR image of the second anatomical structure of the target subject by performing the target scan based on the modified target scanning protocol.

In some embodiments, the method may further include generating a display image indicating the position of an FOV of the target scan with respect to the target subject based on the target scanning protocol, wherein the information relating to the target scanning protocol includes the display image.

Another aspect of the present disclosure relates to a system for MRI. The system includes at least one storage device including a set of instructions and at least one processor in communication with the at least one storage device. When executing the set of instructions, the at least one processor is directed to cause the system to implement operations. The operations may include obtaining a reference MR image of a target subject. The reference MR image may be acquired by performing a reference MR scan on a first anatomical structure of the target subject before a target MR scan. The target MR scan may be to be performed on a second anatomical structure of the target subject. The second anatomical structure may be smaller than the first anatomical structure. The operations may include determining geometrical information of the second anatomical structure based on the reference MR image. The operations may include determining a target scanning protocol with respect to the target MR scan based on the geometrical information. The operations may include acquiring a target MR image of the second anatomical structure by performing the target scan based on the target scanning protocol. In the target MR image, the second anatomical structure may be not overlapped with other anatomical structures of the target subject.

Another aspect of the present disclosure relates to an MRI system. The system includes at least one storage device including a set of instructions and at least one processor in communication with the at least one storage device. When executing the set of instructions, the at least one processor is directed to cause the system to implement operations. The operations may include obtaining a reference magnetic resonance (MR) image of a target subject, wherein the reference MR image includes multiple anatomical structures of the target subject. The operations may include determining a target anatomical structure of the target subject based on the reference MR image of the target subject, the target anatomical structure being one of the multiple anatomical structures of the target subject. The operations may include determining a target scanning protocol by optimizing, based on geometrical information of the target anatomical structure, a scanning protocol to be scanned, a field of view (FOV) of the target scanning protocol can cover the target anatomical structure. The operations may include acquiring a target MR image of the target anatomical structure of the target subject by performing the target scanning protocol, wherein in the target MR image, the second anatomical structure is not overlapped with other anatomical structures of the target subject.

In some embodiments, the optimizing the scanning protocol to be scanned based on the geometrical information of the target anatomical structure may include optimizing first parameters of the scanning protocol to be scanned, the first parameters including at least one of a size of the FOV, a center of the FOV, a phase encoding (PE) direction, or a degree of oversampling in the PE direction. The MRI system may further include a display configured to display second parameters of the target scanning protocol, the second parameters including the optimized first parameters. The display may be further configured to display the reference MR image of the target subject. A FOV frame corresponding to the target scanning protocol may be set on the reference MR image, and the FOV frame can be adjusted.

Additional features may be set forth in part in the description which follows, and in part may become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
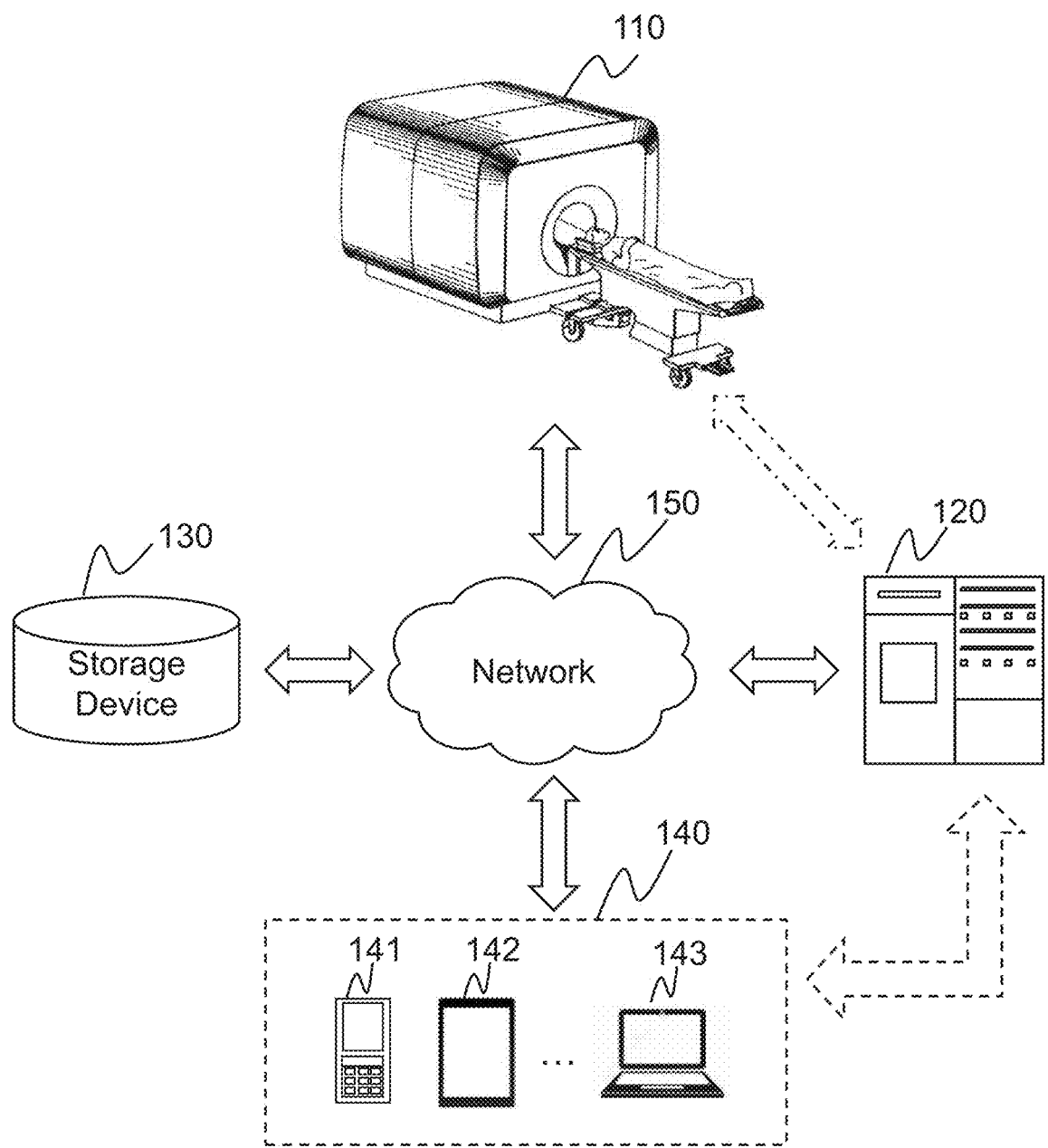
FIG. 1 is a schematic diagram illustrating an exemplary MRI system according to some embodiments of the present disclosure.

In the following detailed description, numerous specific details may be set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments may be readily apparent to those skilled in the art, and the general principles defined herein may be applied to other embodiments and applications without departing from the spirit and scope of the present disclosure. Thus, the present disclosure may be not limited to the embodiments shown, but to be accorded the widest scope consistent with the claims.

The terminology used herein may be for the purpose of describing particular example embodiments only and may be not intended to be limiting. As used herein, the singular forms "a," "an," and "the" may be intended to include the plural forms as well, unless the context clearly indicates otherwise. It may be understood that the terms "system," "unit," "module," and/or "block" used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It may be appreciated that software modules may be callable from other modules or from themselves, and/or may be invoked in response to detected events or interrupts. Software modules configured for execution on computing devices may be provided on a computer readable medium or as a digital download (and can be originally stored in a compressed or installable format that requires installation, decompression, or decryption prior to execution). Such software code may be stored, partially or fully, on a memory device of the executing computing device, for execution by the computing device. Software instructions may be embedded in a firmware, such as an EPROM. It may be further appreciated that hardware modules (e.g., circuits) may be included in connected or coupled logic units, such as gates and flip-flops, and/or may be included in programmable units, such as programmable gate arrays or processors. The modules or computing device functionality described herein may be preferably implemented as hardware modules, but may be software modules as well. In general, the modules described herein refer to logical modules that may be combined with other modules or divided into units despite their physical organization or storage.

Certain terminology has been used to describe embodiments of the present disclosure. For example, the terms "one embodiment," "an embodiment," and/or "some embodiments" may mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification may not necessarily all referring to the same embodiment. Furthermore, the particular features, structures or characteristics may be combined as suitable in one or more embodiments of the present disclosure.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings may be for the purpose of illustration and description only and may be not intended to limit the scope of the present disclosure.

The flowcharts used in the present disclosure may illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

The present disclosure provides systems and methods for MRI. The systems may obtain a reference MR image of a target subject. The reference MR image may be acquired by performing a reference MR scan on a first anatomical structure of the target subject before a target MR scan. The target MR scan may be performed on a second anatomical structure of the target subject. The second anatomical structure may be smaller than the first anatomical structure. The systems may determine, based on the reference MR image of the target subject, geometrical information of the second anatomical structure of the target subject. The systems may further determine a target scanning protocol with respect to the target MR scan based on the geometrical information of the second anatomical structure of the target subject. The systems may acquire a target MR image of the second anatomical structure of the target subject by performing the target scan based on the target scanning protocol. In the target MR image, the second anatomical structure may be not overlapped with other anatomical structures of the target subject.

According to the embodiments of the present disclosure, the target scanning protocol is determined based on the geometrical information of the second anatomical structure that is smaller than the first anatomical structure, and the target scan is performed based on the target scanning protocol. Therefore, a size of a field of view (FOV) of the target scan is smaller than a size of an FOV of the reference MR scan. Accordingly, compared with the reference MR scan, the number of phase encodings and scanning time of the target scan are reduced, thereby improving the speed and efficiency of the MRI. In addition, the FOV of the target scan may cover the second anatomical structure, which makes that in the target MR image, the second anatomical structure is not overlapped with other anatomical structures of the target subject, thus improving the image quality of the target MR image.

FIG. 1 is a schematic diagram illustrating an exemplary MRI system 100 according to some embodiments of the present disclosure. As shown in FIG. 1, the MRI system 100 may include an MR scanner 110, a processing device 120, a storage device 130, one or more terminals 140, and a network 150. In some embodiments, the MR scanner 110, the processing device 120, the storage device 130, and/or the terminal(s) 140 may be connected to and/or communicate with each other via a wireless connection, a wired connection, or a combination thereof.

The MR scanner 110 may be configured to scan a target subject or a portion thereof to acquire image data, such as MR signals associated with the target subject or a portion thereof. For example, the MR scanner 110 may detect a plurality of MR signals by applying an MR pulse sequence on the target subject or a portion thereof. In some embodiments, the MR scanner 110 may include, for example, a magnetic body, a gradient coil, an RF coil, etc. In some embodiments, the MR scanner 110 may be a permanent magnet MR scanner, a superconducting electromagnet MR scanner, or a resistive electromagnet MR scanner, etc., according to types of the magnetic body. In some embodiments, the MR scanner 110 may be a high-field MR scanner, a mid-field MR scanner, a low-field MR scanner, etc., according to the intensity of the magnetic field.

In some embodiments, the processing device 120 may be a single server or a server group. The server group may be centralized or distributed. The processing device 120 may process data and/or information obtained from the MR scanner 110, the storage device 130, and/or the terminal(s) 140. For example, the processing device 120 may obtain a reference MR image by performing a reference MR scan on a first anatomical structure of the target subject and determine, based on the reference MR image of the target subject, geometrical information of a second anatomical structure of the target subject. Further, the processing device 120 may determine a target scanning protocol with respect to a target MR scan based on the geometrical information of the second anatomical structure of the target subject and acquire a target MR image of the second anatomical structure of the target subject by performing the target scan based on the target scanning protocol.

In some embodiments, the processing device 120 may be local or remote from the MRI system 100. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 or a portion of the processing device 120 may be integrated into the MR scanner 110 and/or the terminal(s) 140. In some embodiments, the processing device 120 may be implemented by a computing device 200 having one or more components as described in connection with FIG. 2.

It should be noted that the processing device 120 in the present disclosure may include one or multiple processors. Thus operations and/or method steps that are performed by one processor may also be jointly or separately performed by the multiple processors. For example, if in the present disclosure the processor of the computing device 120 executes both operation A and operation B, it should be understood that operation A and operation B may also be performed by two or more different processors jointly or separately in the processing device 120 (e.g., a first processor executes operation A and a second processor executes operation B, or the first and second processors jointly execute operations A and B).

The storage device 130 may store data (e.g., the reference MR image, the target scanning protocol, the target MR image), instructions, and/or any other information. In some embodiments, the storage device 130 may store data obtained from the MR scanner 110, the processing device 120, and/or the terminal(s) 140. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or a combination thereof. In some embodiments, the storage device 130 may be implemented on a cloud platform as described elsewhere in the disclosure. In some embodiments, the storage device 130 may be part of the MR scanner 110, the processing device 120, and/or the terminal(s) 140.

The terminal(s) 140 may be configured to enable a user interaction between a user and the MRI system 100. In some embodiments, the terminal(s) 140 may be connected to and/or communicate with the MR scanner 110, the processing device 120, and/or the storage device 130. In some embodiments, the terminal(s) 140 may include a mobile device 140-1, a tablet computer 140-2, a laptop computer 140-3, or the like, or a combination thereof. In some embodiments, the terminal(s) 140 may be part of the processing device 120 and/or the MR scanner 110.

The network 150 may include any suitable network that can facilitate the exchange of information and/or data for the MRI system 100. In some embodiments, one or more components of the MRI system 100 (e.g., the MR scanner 110, the processing device 120, the storage device 130, the terminal(s) 140, etc.) may communicate information and/or data with one or more other components of the MRI system 100 via the network 150.

It should be noted that the above description is intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. In some embodiments, the MRI system 100 may include one or more additional components and/or one or more components described above may be omitted. Additionally or alternatively, two or more components of the MRI system 100 may be integrated into a single component. For example, the processing device 120 may be integrated into the MR scanner 110. As another example, a component of the MRI system 100 may be replaced by another component that can implement the functions of the component. However, those variations and modifications do not depart from the scope of the present disclosure.

Figure 2:
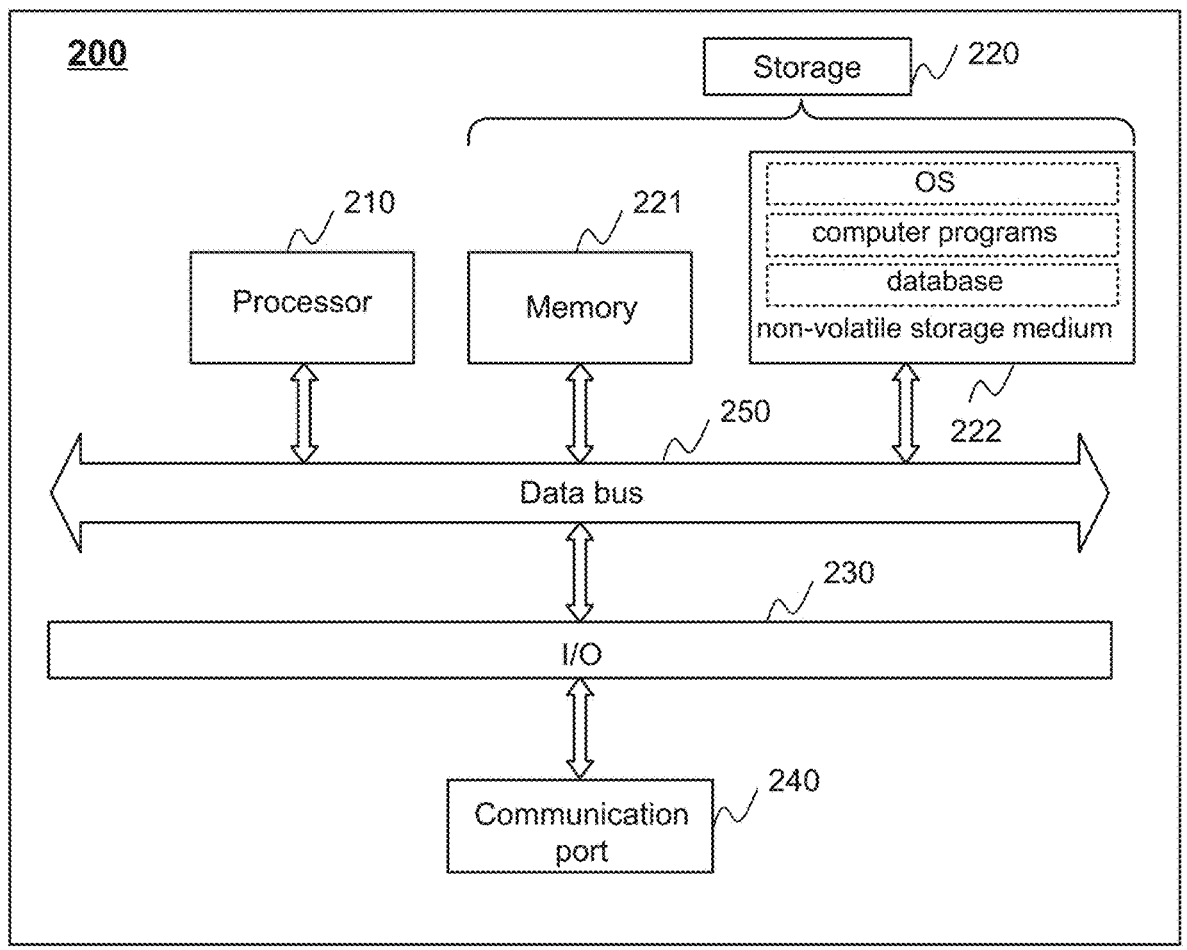
FIG. 2 is a schematic diagram illustrating exemplary hardware and/or software components of a computing device according to some embodiments of the present disclosure.

FIG. 2 is a schematic diagram illustrating exemplary hardware and/or software components of a computing device according to some embodiments of the present disclosure. The computing device 200 may be used to implement any component of the MRI system 100 as described herein. For example, the processing device 120 and/or a terminal 140 may be implemented on the computing device 200, respectively, via its hardware, software program, firmware, or a combination thereof. Although only one such computing device is shown, for convenience, the computer functions relating to the MRI system 100 as described herein may be implemented in a distributed fashion on a number of similar platforms, to distribute the processing load. As illustrated in FIG. 2, the computing device 200 may include a processor 210, a storage 220, an input/output (I/O) 230, a communication port 240, and a data bus 250.

The processor 210 may execute computer instructions (e.g., program code) and perform functions of the processing device 120 in accordance with techniques described herein. The storage 220 may store data/information obtained from the MR scanner 110, the storage device 130, the terminal(s) 140, and/or any other component of the MRI system 100. In some embodiments, the storage 220 may store one or more programs and/or instructions to perform exemplary methods described in the present disclosure. The I/O 230 may input and/or output signals, data, information, etc. In some embodiments, the I/O 230 may enable a user interaction with the processing device 120. The communication port 240 may be connected to a network (e.g., the network 150) to facilitate data communications. The data bus 250 may be configured to implement data communications among components of the computing device 200.

Figure 3:
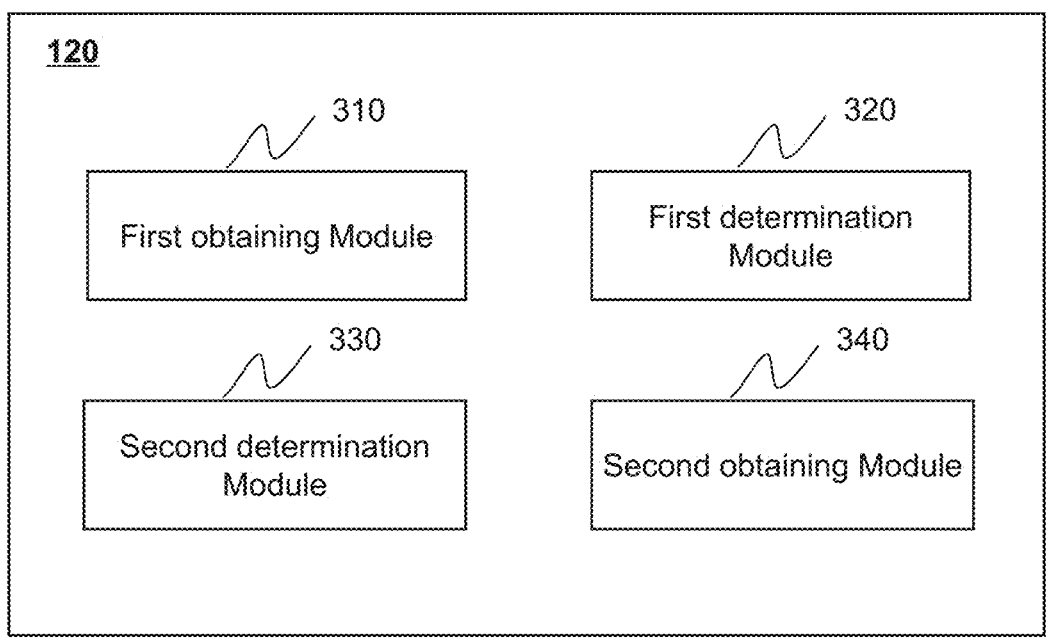
FIG. 3 is a block diagram illustrating an exemplary processing device according to some embodiments of the present disclosure.

FIG. 3 is a block diagram illustrating an exemplary processing device according to some embodiments of the present disclosure. The processing device 120 may be implemented on the computing device 200 (e.g., the processor 210) illustrated in FIG. 2. As illustrated in FIG. 3, the processing device 120 may include a first obtaining module 310, a first determination module 320, a second determination module 330, and a second obtaining module 340.

The first obtaining module 310 may be configured to obtain a reference magnetic resonance (MR) image of a target subject. More descriptions regarding the obtaining of the reference MR image may be found elsewhere in the present disclosure (e.g., operation 410 and the description thereof).

The first determination module 320 may be configured to determine, based on the reference MR image of the target subject, geometrical information of the second anatomical structure of the target subject. More descriptions regarding the determination of the geometrical information of the second anatomical structure may be found elsewhere in the present disclosure (e.g., operation 420 and the description thereof).

The second determination module 330 may be configured to determine a target scanning protocol with respect to the target MR scan based on the geometrical information of the second anatomical structure of the target subject. More descriptions regarding the determination of the target scanning protocol may be found elsewhere in the present disclosure (e.g., operation 430 and the description thereof).

The second obtaining module 340 may be configured to acquire a target MR image of the second anatomical structure of the target subject by performing the target scan based on the target scanning protocol. More descriptions regarding the acquisition of the target MR image may be found elsewhere in the present disclosure (e.g., operation 440 and the description thereof).

It should be noted that the above description regarding the processing device 120 is merely provided for the purposes of illustration, and not intended to limit the scope of the present disclosure. For persons having ordinary skills in the art, multiple variations and modifications may be made under the teachings of the present disclosure. In some embodiments, two or more of the modules may be combined into a single module, and any one of the modules may be divided into two or more units. For example, the first obtaining module 310 and the second obtaining module 340 may be combined into a single module configured to obtain the reference MR image and the target MR image. As another example, the first determination module 320 and the second determination module 330 may be combined into a single module configured to determine the geometrical information of the second anatomical structure of the target subject and the target scanning protocol with respect to the target MR scan. However, those variations and modifications do not depart from the scope of the present disclosure.

Figure 4:
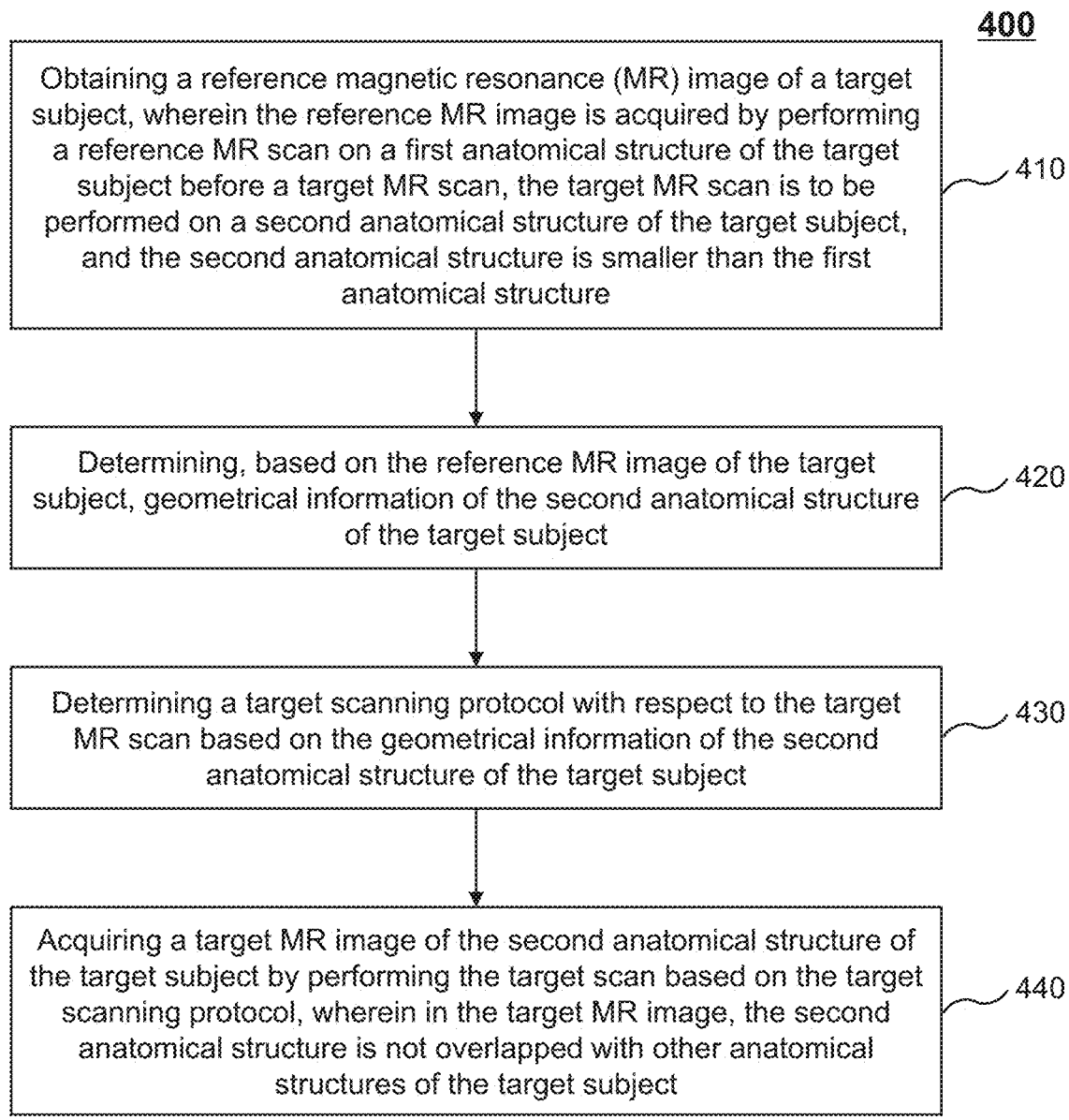
FIG. 4 is a flowchart illustrating an exemplary process for MRI according to some embodiments of the present disclosure.

FIG. 4 is a flowchart illustrating an exemplary process for MRI according to some embodiments of the present disclosure. In some embodiments, process 400 may be executed by the MRI system 100. For example, the process 400 may be implemented as a set of instructions (e.g., an application) stored in a storage device (e.g., the storage device 130, the storage 220). In some embodiments, the processing device 120 (e.g., the processor 210, and/or one or more modules of the processing device 120 illustrated in FIG. 3) may execute the set of instructions and may accordingly be directed to perform the process 400.

In 410, the processing device 120 (e.g., the first obtaining module 310) may obtain a reference magnetic resonance (MR) image of a target subject.

In some embodiments, the target subject may include a biological subject and/or a non-biological subject. The biological subject may be a human being (e.g., a patient), an animal, a plant, or a specific portion, organ, and/or tissue thereof. In some embodiments, the subject may be a man-made composition of organic and/or inorganic matters that are with or without life. In the present disclosure, the term "object" or "subject" are used interchangeably in the present disclosure.

In some embodiments, the reference MR image may be acquired by performing a reference MR scan on a first anatomical structure of the target subject before a target MR scan. In some embodiments, the target MR scan may be used to acquire an image for performing clinical diagnosis on the target subject, and the reference MR image may be used to determine a scanning protocol (e.g., an FOV, a PE direction) of the target MR scan. In some embodiments, the target MR scan may be performed on a second anatomical structure (also referred to as a target anatomical structure) of the target subject. In some embodiments, the first anatomical structure and/or the second anatomical structure may include tissues and/or organs of the target subject, and the second anatomical structure may be smaller than the first anatomical structure. In some embodiments, the reference MR image may include multiple anatomical structures (e.g., the first anatomical structure) of the target subject, and the second anatomical structure may be one of the multiple anatomical structures of the target subject.

In some embodiments, the second anatomical structure may be a portion of the first anatomical structure. For example, the first anatomical structure may be the chest cavity of the target subject, and the second anatomical structure may be a tissue and/or organ (e.g., a heart, a lung, a lesion, etc.) of interest inside the chest cavity. Since the first anatomical structure is larger than the second anatomical structure, a size of an FOV of the reference MR scan is larger than that of an FOV of the target MR scan, and the resolution of the reference MR image is lower than the resolution of the target MR scan.

In some embodiments, the reference MR image may be an MR image extracted from calibration data acquired during a scan calibration phase prior to the start of the target MR scan. In some embodiments, the reference MR image may be a 2-dimensional (2D) multi-layer MR image (e.g., a 2D multi-layer positioning image) or a 3-dimensional (3D) MR image. The 2D multi-layer MR image may be acquired by performing a 2D multi-layer MR scan on the first anatomical structure of the target subject. In some embodiments, the types of the reference MR scan and the target MR scan may be the same or different. For example, the target MR scan is a 3D MR scan, and the reference MR scan is a 2D multi-layer MR scan. In some embodiments, the reference MR scan may be a low resolution fast scan, for example, a scout scan.

In some embodiments, the processing device 120 may obtain the reference MR image of the target subject by directing or causing the MR scanner 110 to perform the reference MR scan on the first anatomical structure of the target subject. In some embodiments, the reference MR image of the target subject may be previously obtained and stored in a storage device (e.g., the storage device 130, the storage device 220) disclosed elsewhere in the present disclosure and/or an external storage device. The processing device 120 may obtain the reference MR image of the target subject from the storage device and/or the external storage device via a network (e.g., the network 150).

In 420, the processing device 120 (e.g., the first determination module 320) may determine, based on the reference MR image of the target subject, geometrical information of the second anatomical structure of the target subject.

In some embodiments, the processing device 120 may identify the second anatomical structure in the reference MR image by segmenting the reference MR image. Merely by way of example, the processing device 120 may segment the reference MR image using an image segmentation algorithm, such as a threshold-based image segmentation algorithm, a region-based image segmentation algorithm, an edge detection-based image segmentation algorithm, an image segmentation algorithm based on a specific theory (e.g., cluster analysis, fuzzy set theory, genetic coding, wavelet transform), or the like, or any combination thereof. In some embodiments, the processing device 120 may segment the reference MR image using a machine learning model. Specifically, the processing device 120 may obtain a trained segmentation model of the second anatomical structure, which is trained using labeled sample MR images.

Figure 5A:
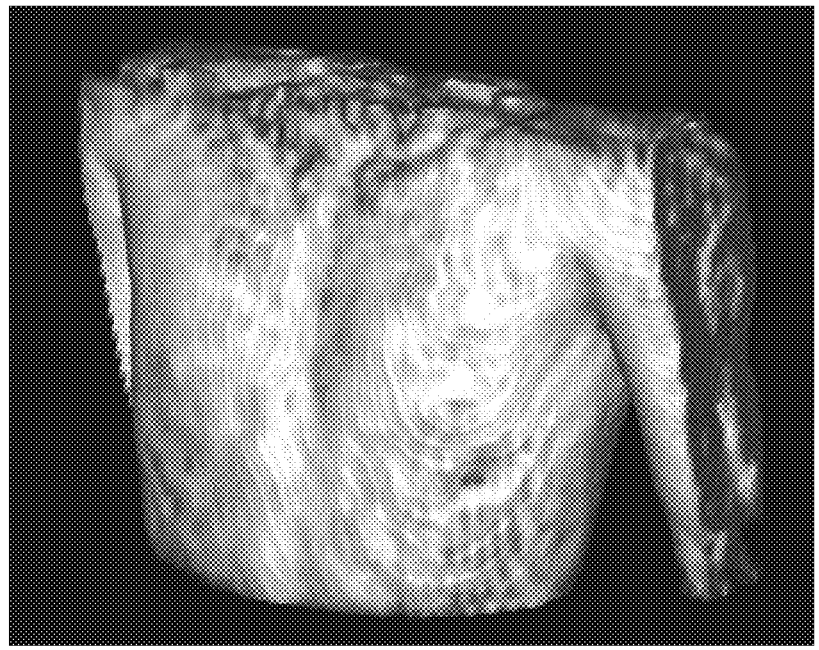
FIG. 5A is a schematic diagram illustrating an exemplary three-dimensional (3D) reference MR image of the chest of a patient according to some embodiments of the present disclosure.
Figure 5B:
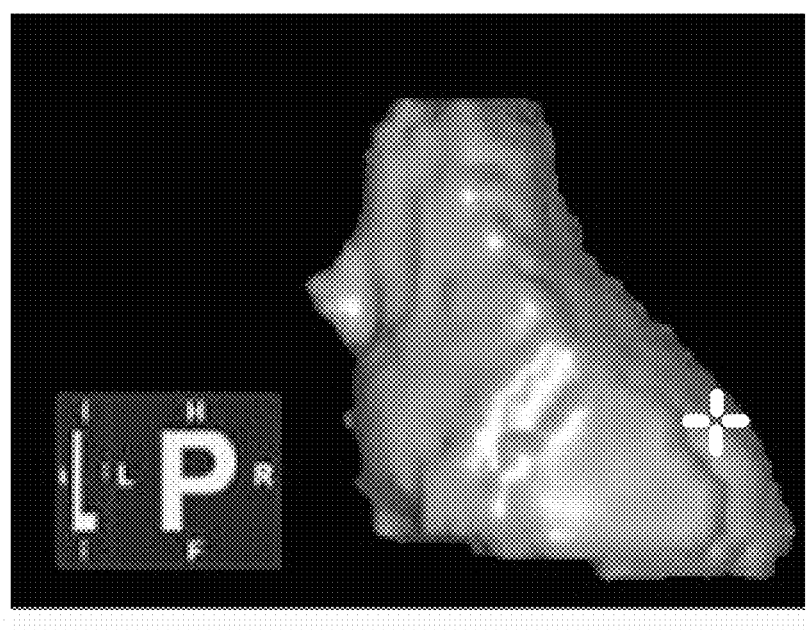
FIG. 5B is a schematic diagram illustrating an exemplary second anatomical structure of a patient according to some embodiments of the present disclosure.

FIG. 5A is a schematic diagram illustrating an exemplary 3D reference MR image of the chest of a patient according to some embodiments of the present disclosure. FIG. 5B is a schematic diagram illustrating an exemplary second anatomical structure of the patient according to some embodiments of the present disclosure. The second anatomical structure illustrated in FIG. 5B was obtained by segmenting the heart of the patient from the 3D reference MR image illustrated in FIG. 5A.

Further, the processing device 120 may determine the geometrical information of the identified second anatomical structure. In some embodiments, the geometrical information of the second anatomical structure of the target subject may include at least one of lengths of the second anatomical structure in multiple preset directions, position information of a geometric center or a geometric center of gravity of the second anatomical structure, the size of the second anatomical structure, the shape of the second anatomical structure, or the like, or any combination thereof. The preset directions may include three axial directions of a preset coordinate system. Merely by way of example, the preset coordinate system may include an international electrotechnical commission (IEC) coordinate system, an anatomical coordinate system, a DICOM coordinate system, etc. The lengths of the second anatomical structure of the target subject in the multiple preset directions may indicate a size of the second anatomical structure of the target subject along the preset directions. The geometric center or the geometric center of gravity of the second anatomical structure of the target subject may indicate a geometric position of the second anatomical structure of the target subject. The geometric center and the geometric center of gravity of the second anatomical structure of the target subject may be represented by their coordinates of the preset coordinate system. As used herein, the geometrical information may be represented as data in the image domain or the physical world. For example, the length of the second anatomical structure along a direction refers to the length of a representation of the second anatomical structure in an image domain or the length of the second anatomical structure in the physical word.

In some embodiments, the target MR scan is a 3D MR scan. In such cases, the processing device 120 may directly determine the geometrical information of the second anatomical structure of the target subject. For example, for each of the multiple preset directions, the processing device 120 may determine the longest length of the second anatomical structure in the reference MR image along the preset direction as a length of the second anatomical structure in the preset direction. As another example, the processing device 120 may determine an average of projection positions of pixels of the second anatomical structure in the reference MR image on the three axial directions of the preset coordinate system as a geometric center of the second anatomical structure of the target subject. As yet another example, the processing device 120 may determine a weighted average of the projection positions of the pixels of the second anatomical structure in the reference MR image on the three axial directions of the preset coordinate system as a geometric center of gravity of the second anatomical structure of the target subject. In some embodiments, for each of the three axial directions of the preset coordinate system, the projection positions of the pixels of the second anatomical structure on the axial direction may be determined, and a weight of each projection position may be determined based on a number of pixels corresponding to the projection value; then a weighted sum of the projection positions may be determined and designated as the coordinate of the geometric center of gravity on the axial direction.

In some embodiments, the target MR scan is a 2D multi-layer MR scan directed to multiple scanning layers. In such cases, for each of the multiple scanning layers, the processing device 120 may generate a multiple planar reconstruction (MPR) image based on position information of the scanning layer and the reference MR image of the target subject. The position information of the scanning layer may include a planar normal vector of the scanning layer (which is perpendicular to the scanning layer) and a position of the scanning layer in a direction of the planar normal vector. The plane normal vector of the scanning layer indicates a direction of the scanning layer, e.g., a sagittal scan, a coronal scan. The position of the scanning layer in the direction of the plane normal vector indicates a position of the scanning layer in the multiple scanning layers. For example, when the target MR scan is a 2D multi-layer MR scan of the abdomen, different parts of the liver are located at different positions in the direction of the planar normal vector. In some embodiments, the position information of the scanning layer may be set manually by a user (e.g., a doctor) or determined automatically by the processing device 120 based on a 2D multi-layer scanning protocol of the target MR scan. In some embodiments, based on the position information of the scanning layer, the processing device 120 may determine an image layer corresponding to the scanning layer in the reference MR image of the target subject. Based on image data of the image layer, the processing device 120 may generate an MPR image of the scanning layer. It should be noted that each scanning layer in the multiple scanning layers corresponds to one MPR image.

Further, the processing device 120 may determine the geometrical information of the second anatomical structure of the target subject based on MPR images corresponding to the multiple scanning layers. Specifically, the processing device 120 may stack the MPR images corresponding to the multiple scanning layers to form a predicted 3D image of the second anatomical structure of the target subject. The processing device 120 may determine geometric information of the second anatomical structure of the target subject based on the predicted 3D image. For example, for each of the multiple preset directions, the processing device 120 may determine the longest length of the second anatomical structure in the 3D image along the preset direction as the length of the second anatomical structure in the preset direction. As another example, the processing device 120 may determine an average of projection positions of pixels of the second anatomical structure in the reference MR image on the three axial directions of the preset coordinate system as a geometric center of the second anatomical structure of the target subject. As yet another example, the processing device 120 may determine a weighted average of the projection positions of the pixels of the second anatomical structure in the 3D image on the three axial directions of the preset coordinate system as a geometric center of gravity of the second anatomical structure of the target subject.

In 430, the processing device 120 (e.g., the second determination module 330) may determine a target scanning protocol with respect to the target MR scan based on the geometrical information of the second anatomical structure of the target subject.

The target scanning protocol may include parameters to be used during the execution of the target MR scan. In some embodiments, the target scanning protocol may include a size of an FOV of the target MR scan, a center of the FOV, a phase encoding (PE) direction of the target MR scan, a degree of oversampling in the PE direction, a number of PE steps in the PE direction, or the like, or any combination thereof.

Figure 6A:
FIGS. 6A-6B are schematic diagrams illustrating exemplary MR images of a patient obtained with a relatively small FOV according to some embodiments of the present disclosure.
Figure 6B:
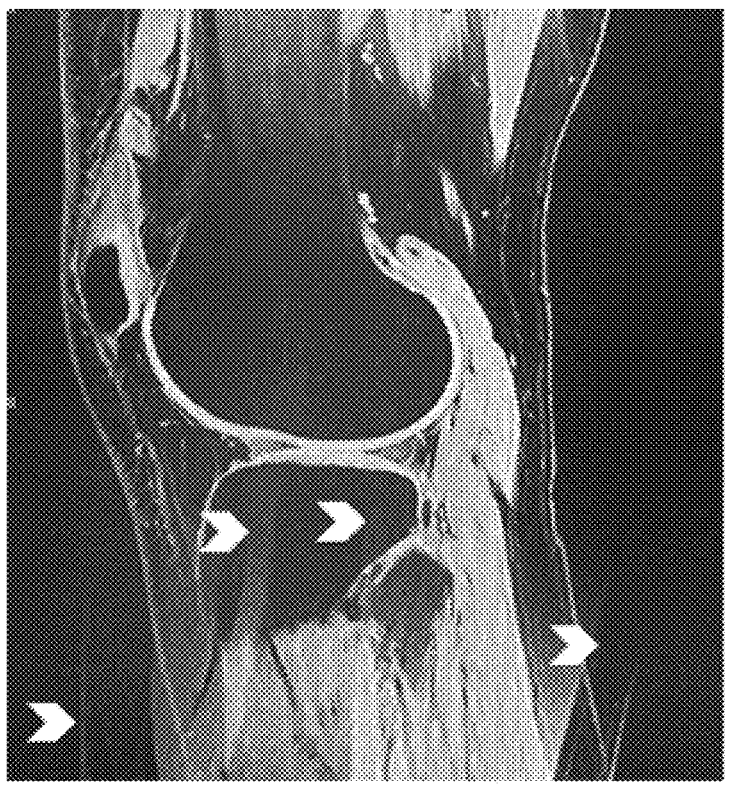
Figure 6C:
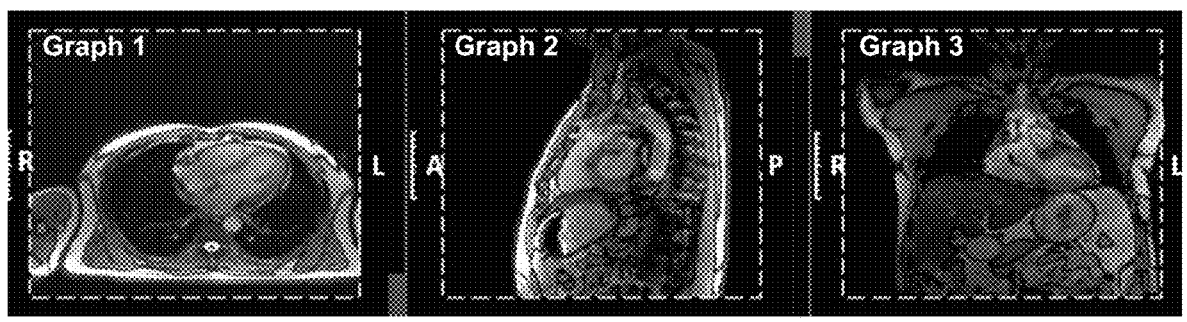
FIG. 6C is a schematic diagram illustrating exemplary MR images of a patient obtained with a relatively large FOV according to some embodiments of the present disclosure.

Generally, when an FOV of an MR scan is too small, wrap around artifacts (e.g., overlap between different anatomical structures of the target subject) may occur in an MR image acquired by performing the MR scan. For example, FIGS. 6A-6B are schematic diagrams illustrating exemplary MR images of a patient obtained with a relatively small FOV according to some embodiments of the present disclosure. As shown in FIG. 6A, in an MR image of a patient, the shoulder (e.g., a region indicated by arrows) of the patient overlaps the thoracic cavity, thereby producing severe artifacts in the MR image. As shown in FIG. 6B, in an MR image of a patient, the thigh of the patient overlaps the calf below the knee joint, thereby producing severe artifacts in the MR image. In traditional MR imaging, in order to avoid or reduce the wrap around artifacts in the MR image, an MR scan is usually performed with a relatively large FOV. For example, FIG. 6C is a schematic diagram illustrating exemplary MR images of a patient obtained with a relatively large FOV according to some embodiments of the present disclosure. As shown in FIG. 6C, graph 1 is a transverse section view, graph 2 is a sagittal section view, and graph 3 is a coronal section view. A target imaging structure (e.g., the second anatomical structure) in FIG. 6C is the heart, however, an FOV of the MR scan in FIG. 6C is so large that some unnecessary regions (e.g., the lungs, the abdomen, the shoulders) are scanned in the MR scan, which generates a large amount of invalid information and lengthens the scanning time.

In some embodiments, to address the above mentioned problems, the processing device 120 may determine a size of the FOV of the target scan based on the lengths of the second anatomical structure in the multiple preset directions. Merely by way of example, the FOV may be rectangular. The processing device 120 may designate a longest length of the second anatomical structure of the target subject in the multiple preset directions as a long edge of the rectangular FOV and a shortest length of the second anatomical structure of the target subject in the multiple preset directions as a short edge of the rectangular FOV.

In some embodiments, the processing device 120 may designate a sum or product of the longest length of the second anatomical structure and a first deviation value as the long edge of the rectangular FOV, and designate a sum or product of the shortest length of the second anatomical structure and a second deviation value as the short edge of the rectangular FOV. In some embodiments, the first deviation value and the second deviation value may be the same or different. Optionally, the first and second deviation values may be preset values. In some embodiments, the processing device 120 may determine a minimum bounding rectangle (MBR) of the second anatomical structure and designate the MBR of the second anatomical structure or a region slightly larger than the MBR of the second anatomical structure as the rectangular FOV. In other words, the size of the FOV of the target scan may equal to or slightly greater than a size of the second anatomical structure of the target subject.

Figure 7:
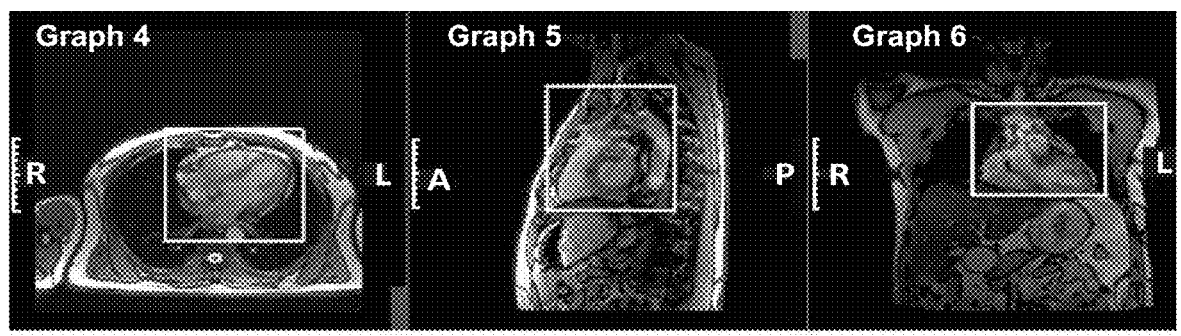
FIG. 7 is a schematic diagram illustrating an exemplary FOV of an MR scan according to some embodiments of the present disclosure.

FIG. 7 is a schematic diagram illustrating an exemplary FOV of an MR scan according to some embodiments of the present disclosure. As shown in FIG. 7, graph 4 is a transverse section view, graph 5 is a sagittal section view, and graph 6 is a coronal section view, and rectangular regions in graph 4, graph 5, and graph 6 represent the FOV of the MR scan. It should be noted that since the second anatomical structure (e.g., the heart) may have different longest and shortest lengths in the transverse section view, the sagittal section view, and the coronal section view, sizes of the FOV of the MR scan in the transverse section view, the sagittal section view, and the coronal section view may be different and determined separately. For example, the size of the FOV in the transverse section view may be determined based on the longest length and the shortest length of the second anatomical structure in the transverse section view.

In some embodiments, the processing device 120 may determine a center of the FOV of the target scan based on the position information of the geometric center or the geometric center of gravity of the second anatomical structure. In some embodiments, when the target scan is a 2D multi-layer MR scan directed to multiple scanning layers, the processing device 120 may determine a central scanning layer of the multiple scanning layers, and project the geometric center or the geometric center of gravity of the second anatomical structure onto the central scanning layer to determine a projection center. Further, the processing device 120 may designate the projection center as the center of the FOV of the target scan. In some embodiments, when the target scan is a 3D MR scan, the processing device 120 may designate the geometric center or geometric center of gravity of the second anatomical structure as the center of the FOV of the target scan.

In some embodiments, the processing device 120 may determine a PE direction of the target scan based on the lengths of the second anatomical structure in the multiple preset directions. Merely by way of example, the processing device 120 may designate a preset direction corresponding to the shortest length among the lengths of the second anatomical structure in the multiple preset directions as the PE direction of the target scan, which can reduce the number of PE steps in the PE direction, thus reducing the imaging time.

Generally, in the target scan process, a user (e.g., a doctor) needs to observe the anatomical structures of the target subject and adjust the PE direction based on an observation result to reduce artifacts that may occur on the target MR image of the second anatomical structure, which requires that the user have rich experience and good skills. Merely by way of example, the artifacts may include non-wrap around artifacts such as chemical shift artifacts, asymmetric magnetic sensitive artifacts, blood flow motion artifacts, tissue peristaltic artifacts, pharyngeal swallowing artifacts, respiratory motion artifacts, etc. In some embodiments, the processing device 120 may automatically determine the PE direction of the target scan based on whether artifacts will occur in the target MR image, thus reducing the effect of the artifacts on the image quality of the target MR image. More descriptions regarding the determination of the PE direction of the target scan based on whether artifacts will occur in the target MR image may be found elsewhere in the present disclosure (e.g., FIG. 13 and the description thereof).

In some embodiments, the processing device 120 may determine the PE direction of the target scan based on specific application scenarios or user habits. For example, the processing device 120 may determine the PE direction of the target scan based on the setting of a gradient coil of the MR scanner. Specifically, the processing device 120 may designate a direction with a relatively high number of gradient coils as the PE direction, thereby speeding up the target scan.

In some embodiments, the processing device 120 may determine the PE direction using a PE direction determination model. The PE direction determination model may be a machine learning model. The processing device 120 may determine the PE direction by inputting the MR reference image into the PE direction determination model. The PE direction determination model may be trained based on training samples with labels. The training samples with labels may be MR images that are manually labeled with the PE direction by a user. Based on the training samples with the labels, an initial machine learning model may be iteratively trained to optimize its model parameters, thereby generating the PE direction determination model. The PE direction may be determined by the PE direction determination model, which reduces the influence of human subjectivity on determining the PE direction, thereby improving the efficiency and accuracy of determining the PE direction.

In some embodiments, a determination way of the PE direction of the target scan may be chosen according to practical needs. For example, when no artifacts will occur in the target MR image, the processing device 120 may determine the PE direction of the target scan based on the lengths of the second anatomical structure in the multiple preset directions or based on the specific application scenarios or user habits. As another example, when artifacts will occur in the target MR image, the processing device 120 may determine the PE direction of the target scan to avoid the artifacts.

Figure 8:
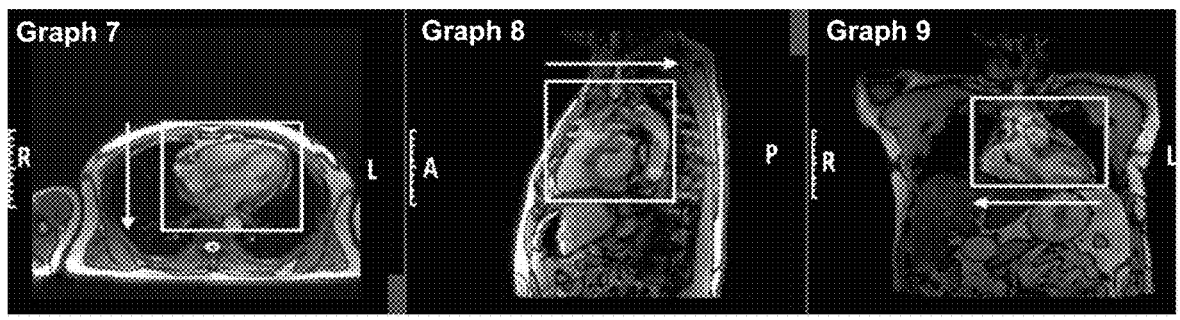
FIG. 8 is a schematic diagram illustrating an exemplary PE direction of an MR scan according to some embodiments of the present disclosure.

FIG. 8 is a schematic diagram illustrating an exemplary PE direction of an MR scan according to some embodiments of the present disclosure. As shown in FIG. 8, graph 7 is a transverse section view, graph 8 is a sagittal section view, and graph 9 is a coronal section view. The rectangular regions in graph 7, graph 8, and graph 9 indicate the FOV of the MR scan, and a direction of an arrow near the FOV indicates the PE direction of the MR scan. The PE direction of the MR scan may be determined according to morphological information of the heart (e.g., the second anatomical structure) and the artifacts that may be generated by the beating of the heart and blood flow movement.

In some embodiments, the target scanning protocol may further include a readout (RO) direction. The RO direction may be a direction perpendicular to the PE direction. In some embodiments, when the target MR scan is a 3D MR scan, the target scanning protocol may further include a slice selection (SS) direction. The SS direction may be specified by the user or preset by the system. The PE direction, the RO direction, and the SS direction may form an orthogonal coordinate system, and the PE direction and the RO direction may be determined from two axis directions of the orthogonal coordinate system other than the SS direction.

In some embodiments, the processing device 120 may determine a reference region in the reference MR image or an MRP image corresponding to each scanning layer of the target MR scan. The processing device 120 may also determine a length of the second anatomical structure in the reference region in a PE direction. Further, the processing device 120 may determine a degree of oversampling in the PE direction based on the length of the second anatomical structure in the reference region in the PE direction and a length of the FOV in the PE direction. The degree of oversampling in the PE direction may indicate an amount of data collected outside the FOV in the PE direction. More descriptions regarding the determination of the degree of oversampling in the PE direction may be found elsewhere in the present disclosure (e.g., FIG. 10 and the description thereof).

In some embodiments, the target scanning protocol may further include a degree of oversampling in the RO direction. The degree of oversampling in the RO direction may indicate an amount of data collected outside the FOV in the RO direction. In some embodiments, when the target MR scan is a 3D MR scan, the target scanning protocol may further include a degree of oversampling in the SS direction. The degree of oversampling in the SS direction may indicate an amount of data collected outside the FOV in the SS direction.

In some embodiments, the processing device 120 may determine a number of PE steps in the PE direction based on the length of the FOV in the PE direction and the degree of oversampling in the PE direction. For example, the processing device 120 may determine the number of PE steps in the PE direction based on the length of the FOV in the PE direction, the degree of oversampling in the PE direction, and spatial resolution information. In some embodiments, the spatial resolution information may include pixel space size information, a degree of zero-fill undersampling in the PE direction, the RO direction, or the SS direction, and/or information of a degree of parallel acceleration in the PE direction, the RO direction, or the SS direction, etc. A degree of zero-fill undersampling may be represented by a ratio of a number of zero-fill lines in k-space to a total number of lines in k-space. Merely by way of example, the processing device 120 may determine the number of PE steps in the PE direction according to equation (1) as follow:

$$MatrixPE=FOVpe \times (1+OSpe)/Pixel \times (1-UndersamplingPE) \quad (1),$$

where MatrixPE refers to the number of PE steps in the PE direction, FOVpe refers to the length of the FOV in the PE direction, OSpe refers to the degree of oversampling in the PE direction, Pixel refers to the pixel space size information, and UndersamplingPE refers to the degree of zero-fill undersampling in the PE direction. As another example, the processing device 120 may determine the number of PE steps in the PE direction according to equation (2) as follows:

$$MatrixPE=FOVpe \times (1+OSpe)/Pixel \times (1-UndersamplingPE) \times SPE \quad (2),$$

where SPE refers to the degree of parallel acceleration in the PE direction.

In some embodiments, the target scanning protocol may further include a number of encoding steps in the RO direction, and the processing device 120 may determine the number of encoding steps in the RO direction based on a length of the FOV in the RO direction, a degree of oversampling in the RO direction, and the spatial resolution information (the pixel space size information, the degree of zero-fill undersampling in the RO direction, and/or the information of a degree of parallel acceleration in the RO direction). Merely by way of example, the processing device 120 may determine the number of encoding steps in the RO direction according to equation (3) as follow:

$$MatrixRO=FOVro \times (1+OSro)/Pixel \times (1-UndersamplingRO) \quad (3),$$

where MatrixRO refers to the number of encoding steps in the RO direction, FOVro refers to the length of the FOV in the RO direction, OSro refers to the degree of oversampling in the RO direction, Pixel refers to the pixel space size information, and UndersamplingRO refers to the degree of zero-fill undersampling in the RO direction. As another example, the processing device 120 may determine the number of encoding steps in the RO direction according to equation (4) as follows:

$$MatrixRO=FOVro \times (1+OSro)/Pixel \times (1-UndersamplingRO) \times SRO \quad (4),$$

where SRO refers to the degree of parallel acceleration in the RO direction.

In some embodiments, when the target MR scan is a 3D MR scan, the target scanning protocol may further include a number of encoding steps in the SS direction, and the processing device 120 may determine the number of encoding steps in the SS direction based on a length of the FOV in the SS direction, a degree of oversampling in the SS direction, and the spatial resolution information (the pixel space size information, the degree of zero-fill undersampling in the SS direction, and/or the information of a degree of parallel acceleration in the SS direction). Merely by way of example, the processing device 120 may determine the number of encoding steps in the SS direction according to equation (5) as follows:

$$MatrixSS=FOVss \times (1+OSss)/Pixel \times (1-UndersamplingSS) \quad (5),$$

where MatrixSS refers to the number of encoding steps in the SS direction, FOVss refers to the length of FOV in the SS direction, OSss refers to the degree of oversampling in the SS direction, Pixel refers to the pixel space size information, and UndersamplingSS is the degree of zero-fill undersampling in the SS direction. As another example, the processing device 120 may determine the number of encoding steps in the SS direction according to equation (6) as follows:

$$MatrixSS=FOVss \times (1+OSss)/Pixel \times (1-UndersamplingSS) \times SSS \quad (6),$$

where SSS refers to the degree of parallel acceleration in the SS direction.

In 440, the processing device 120 (e.g., the second obtaining module 340) may acquire a target MR image of the second anatomical structure of the target subject by performing the target scan based on the target scanning protocol.

In some embodiments, the processing device 120 may direct the MR scanner to perform the target MR scan to acquire K-space data based on parameters (e.g., the size of the FOV of the target MR scan, the center of the FOV, the PE direction of the target MR scan, the degree of oversampling in the PE direction, the number of PE steps in the PE direction, the RO direction of the target MR scan, the degree of oversampling in the RO direction, the number of encoding steps in the RO direction, the SS direction of the target MR scan, the degree of oversampling in the SS direction, the number of encoding steps in the SS direction) in the target scanning protocol, and reconstruct the acquired K-space data to obtain the target MR image.

According to the embodiments of the present disclosure, the FOV of the target MR scan is determined based on the second anatomical structure, which enables automatic adjustment of the size and position of the FOV to cover the second anatomical structure and reduces the size of the FOV, thereby improving the efficiency of MRI. In addition, in some embodiments, in the target MR image, the second anatomical structure may not be overlapped with other anatomical structures of the target subject, accordingly, the structure of the second anatomical structure can be displayed clearly.

Figure 9:
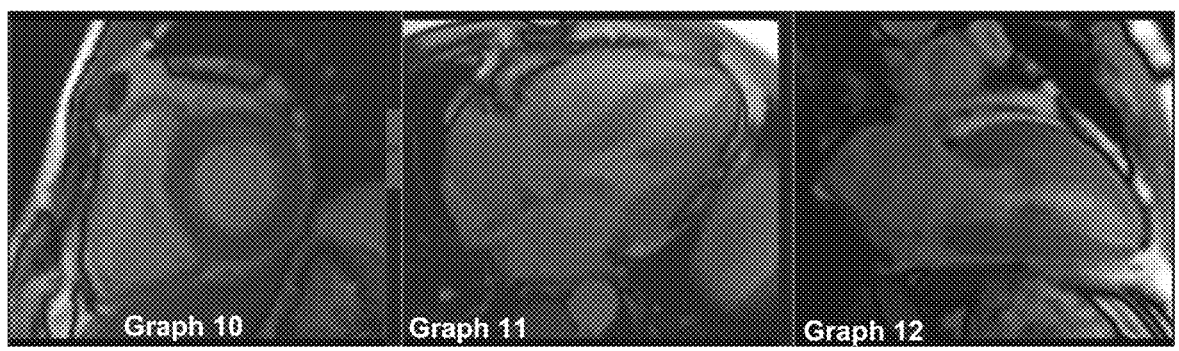
FIG. 9 is a schematic diagram illustrating an exemplary target MR image of the heart according to some embodiments of the present disclosure.

FIG. 9 is a schematic diagram illustrating an exemplary target MR image of the heart according to some embodiments of the present disclosure. As shown in FIG. 9, graph 10 is a transverse section view, graph 11 is a sagittal section view, and graph 12 is a coronal section view. The target MR image in FIG. 9 is acquired in a relatively small FOV, and in the target MR image, the heart (i.e., the second anatomical structure) is not overlapped with other anatomical structures of the target subject, thus presenting the morphology of the second anatomical structure in a complete and clear manner and allowing the user to visually observe the second anatomical structure.

In some embodiments, the processing device 120 may instruct a terminal (e.g., the terminal(s) 140) to display information (e.g., the reference MR image, the target MR image, scanning parameters) relating to the target scanning protocol. A user may input a modification command by the terminal, and the processing device 120 may modify the target scanning protocol based on the modification command received from the terminal. Further, the processing device 120 may acquire the target MR image of the second anatomical structure of the target subject by directing the MR scanner to perform the target scan based on the modified target scanning protocol. More descriptions regarding the display of the target scanning protocol may be found elsewhere in the present disclosure (e.g., FIG. 12 and the description thereof).

Figure 10:
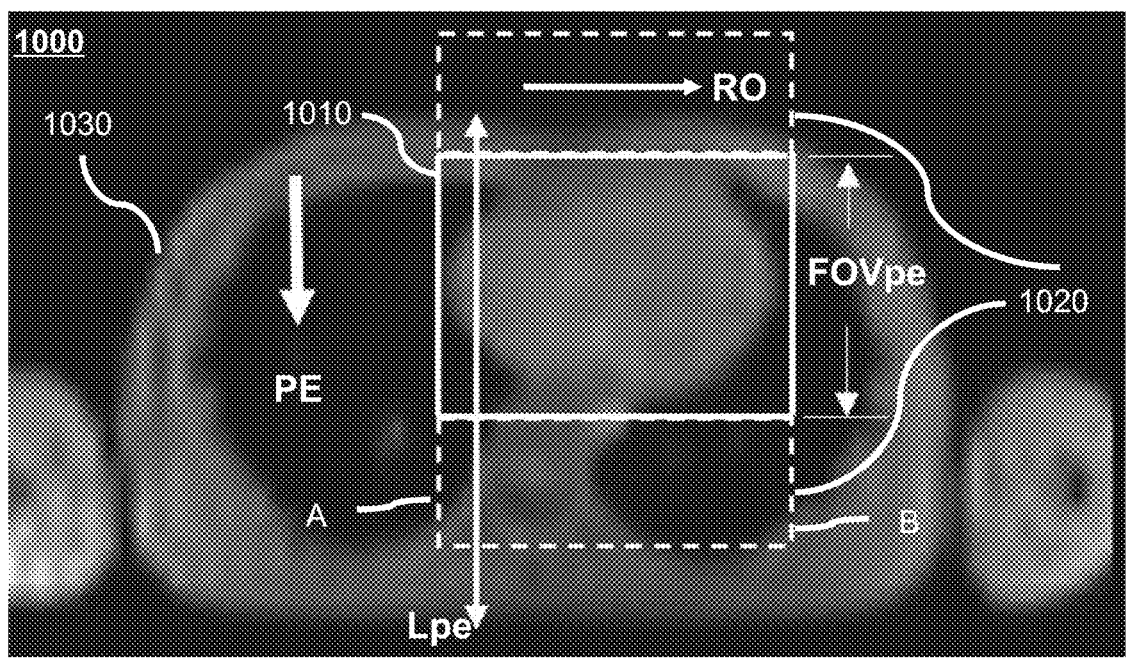
FIG. 10 is a schematic diagram illustrating an exemplary process for determining a degree of oversampling of a target MR scan in a PE direction according to some embodiments of the present disclosure.

FIG. 10 is a schematic diagram illustrating an exemplary process for determining a degree of oversampling of a target MR scan in a PE direction according to some embodiments of the present disclosure In some embodiments, as shown in FIG. 10, the processing device 120 may determine a reference region in a reference MR image 1000 (or an MRP image corresponding to each scanning layer of a target MR scan). A length of the reference region in an RO direction may be equal to a length of an FOV 1010 in the RO direction, and a coordinate of the center of the reference region in the RO direction may be the same as a coordinate of a center of the FOV 1010 in the RO direction. As shown in FIG. 10, the reference region may be a region located between a dotted line A and a dotted line B. Further, the processing device 120 may determine a length Lpe of the target subject 1030 in the reference region in a PE direction and determine a degree of oversampling in the PE direction (denoted as OSpe) based on the length Lpe of the target subject 1030 in the reference region in the PE direction and a length FOVpe of the FOV 1010 in the PE direction. Merely by way of example, the processing device 120 may determine the degree OSpe of oversampling in the PE direction according to equation (5) as follows:

$$OSpe=(Lpe-FOVpe)/FOVpe*100\% \quad (5).$$

In some embodiments, as shown in FIG. 10, the processing device 120 may determine an oversampling region 1020 based on the length Lpe of the target subject 1030 in the reference region in the PE direction, the length FOVpe of the FOV 1010 in the PE direction, and a length of the FOV in the RO direction. In some embodiments, the oversampling region 1020 may include two sub-regions located at two sides of the FOV 1010 along the PE direction. A length of each sub-region in the RO direction may be equal to the length of the FOV 1010 in the RO direction, and a length of the sub-region in the PE direction may be equal to (Lpe−FOVpe)/2.

It should be noted that when the target MR scan is a 2-dimensional multi-layer MR scan directed to multiple scanning layers, the processing device 120 may determine a degree of oversampling corresponding to each scanning layer of the multiple scanning layers, and then designate a maximum value of the degrees of oversampling corresponding to the multiple scanning layers as the degree OSpe of oversampling of the target MR scan.

In some embodiments, the processing device 120 may determine the degree of oversampling of the target MR scan in the PE direction as a sum or product of OSpe and u. u may be a relatively small preset value (e.g., 1%, 2%, etc.), which may reduce the possibility that MR signals of a body surface of the target subject are warped to the second anatomical structure even if segmentation errors (e.g., under-segmentation) exist in a segmentation process of the second anatomical structure. In some embodiments, u may be a relatively large preset value (e.g., 5%, 10%, etc.), which may improve a signal-to-noise ratio of the target MR image.

In some embodiments, when the target MR scan is a 3D MR scan, the degree of oversampling of the target MR scan in an SS direction may be set to slightly greater than 0 (e.g., 10%, 20%, 30%), which may reduce or avoid image overlap in the SS direction caused by a side-lobe of the excitation profile of the excitation pulse.

According to the embodiments of the present disclosure, the degree of oversampling of the target MR scan may be specially set so as to reduce the possibility that other anatomical structures of the target subject overlap with the second anatomical structure in the target MR image of the second anatomical structure of the target subject.

In some embodiments, the information relating to the target scanning protocol may be displayed in an interface of a device (e.g., the terminal(s) 140) that is connected or in communication with the processing device 120. In some embodiments, the information relating to the target scanning protocol may include MR images with respect to the target scanning protocol (e.g., a reference MR image, a target MR image), parameters in the target scanning protocol, a display image indicating the position of the FOV, etc. In some embodiments, the interface may include an image window that displays an MR image (e.g., the reference MR image, the target MR image) (e.g., a transverse section view, a sagittal section view, a coronal section view) with respect to the target scanning protocol. The user may browse the MR image and/or an image layer of multiple image layers of the MR image through the image window. In some embodiments, the processing device 120 may generate a display image indicating a position of an FOV of a target scan with respect to the target subject based on the target scanning protocol. The display image may be displayed in the image window. The user may manually adjust the FOV in the display image. In some embodiments, the interface may display the parameters of the target scanning protocol, and the user may determine or adjust one or more of the parameters of the target scanning protocol via the interface.

Figure 11:
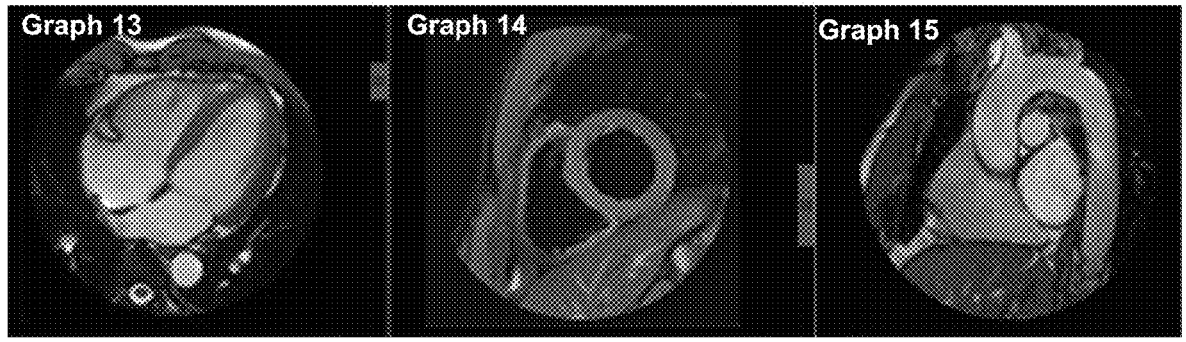
FIG. 11 illustrates different views of a circular region showing the heart segmented from a target MR image according to some embodiments of the present disclosure.

In some embodiments, the processing device 120 may instruct a device (e.g., the terminal(s) 140) that is connected or in communication with the processing device 120 to display a portion of the target MR image corresponding to the second anatomical structure, which may facilitate the user to observe the second anatomical structure to determine the condition of the second anatomical structure. Merely by way of example, a region with a specific shape that encloses the second anatomical structure may be segmented from the target MR image, and displayed via a terminal device. The specific shape may include a regular shape (e.g., a circle, an ellipse, a rectangle, a square, etc.) or an irregular shape. For illustration purposes, FIG. 11 illustrates different views of a circular region showing the heart segmented from a target MR image according to some embodiments of the present disclosure.

Figure 12:
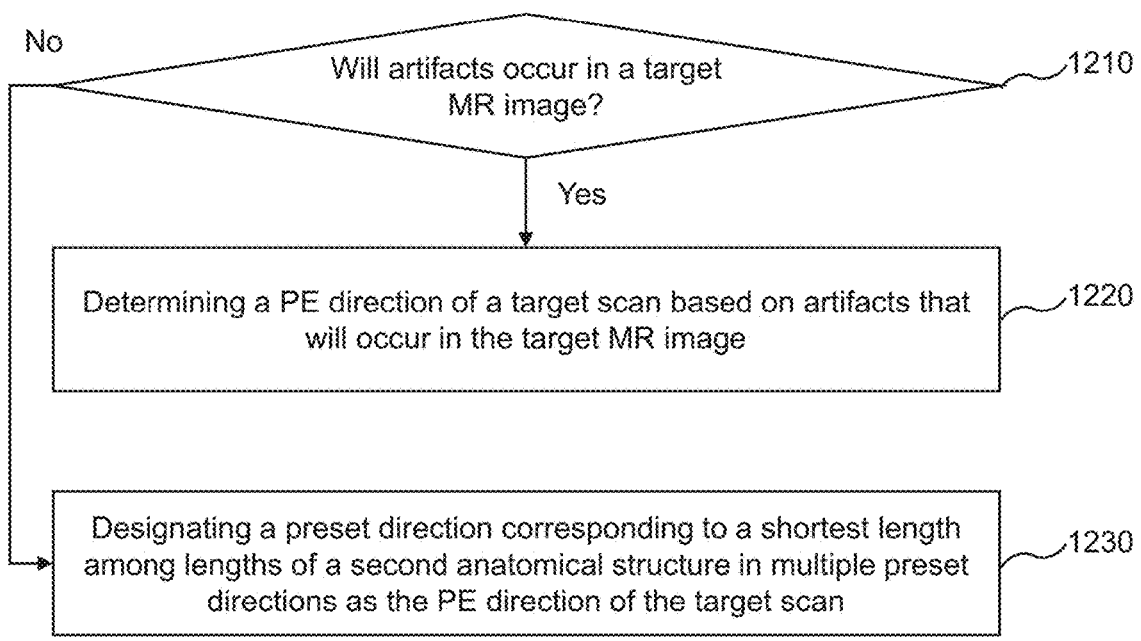
FIG. 12 is a flowchart illustrating an exemplary process for determining a PE direction of a target scan according to some embodiments of the present disclosure.

FIG. 12 is a flowchart illustrating an exemplary process for determining a PE direction of a target scan according to some embodiments of the present disclosure. In some embodiments, the process 1200 may be performed to achieve at least part of operation 430 as described in connection with FIG. 4.

In 1210, the processing device 120 (e.g., the second determination module 330) may determine whether artifacts will occur in a target MR image.

In some embodiments, the artifacts may include non-wrap around artifacts. Merely by way of example, the non-wrap around artifacts may include motion artifacts (e.g., blood flow motion artifacts, vascular pulsation artifacts, cerebrospinal fluid motion artifacts, respiratory motion artifacts), asymmetric magnetic sensitivity artifacts, chemical shift artifacts, tissue peristaltic artifacts, pharyngeal swallowing artifacts, or the like. In some embodiments, the processing device 120 may determine whether artifacts will occur in the target MR image by analyzing the tissues or organs included in the target MR image (i.e., within an FOV of the target scan). For example, if the target MR image includes an organ that undergoes physiological motion or has blood flow, the processing device 120 may determine that motion artifacts will occur in the target MR image.

In 1220, in response to determining that artifacts will occur in the target MR image, the processing device 120 (e.g., the second determination module 330) may determine the PE direction of a target scan based on the artifacts that will occur in the target MR image.

Normally, the non-wrap around artifacts may extend or propagate along the PE direction in the target MR image. Therefore, the PE direction may be determined such that the non-wrap around artifacts will not affect the imaging quality of the second anatomical structure.

Figures 13A, 13B:
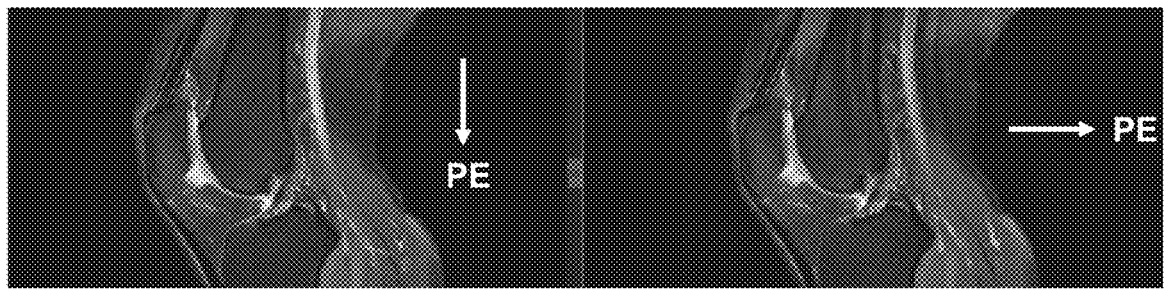
FIGS. 13A-13F are schematic diagrams illustrating exemplary vascular pulsation artifacts according to some embodiments of the present disclosure.
Figures 13C, 13D:
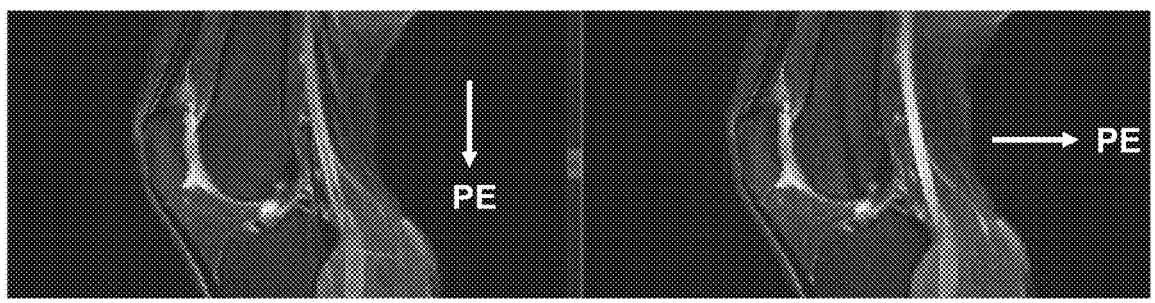
Figures 13E, 13F:
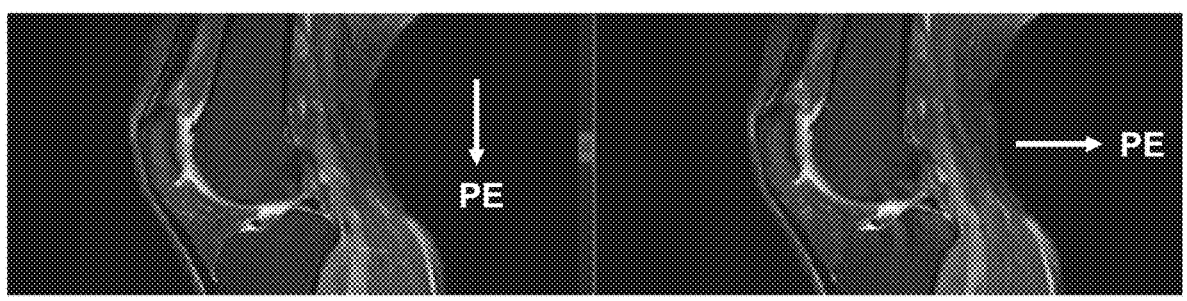

For example, FIGS. 13A-13F are schematic diagrams illustrating exemplary vascular pulsation artifacts according to some embodiments of the present disclosure. The vascular pulsation in the knee causes artifacts along the PE direction. As shown in FIG. 13B, FIG. 13D, and FIG. 13F, when the PE direction is a left-right direction, the vascular pulsation artifacts extend along the left-right direction, thus affecting the imaging of the bone and meniscus. As shown in FIG. 13A, FIG. 13C, and FIG. 13E, when the PE direction is an up-down direction, the vascular pulsation artifacts extend along the up-down direction, which does not affect the imaging of the bone and meniscus.

Figures 14A, 14B:
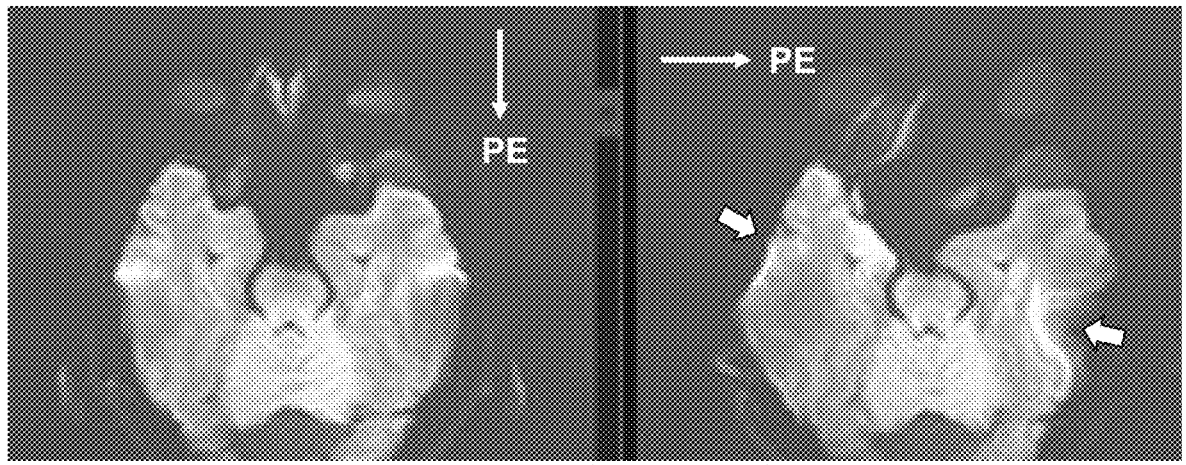
FIGS. 14A-14D are schematic diagrams illustrating exemplary asymmetric magnetically sensitive artifacts according to some embodiments of the present disclosure.
Figures 14C, 14D:
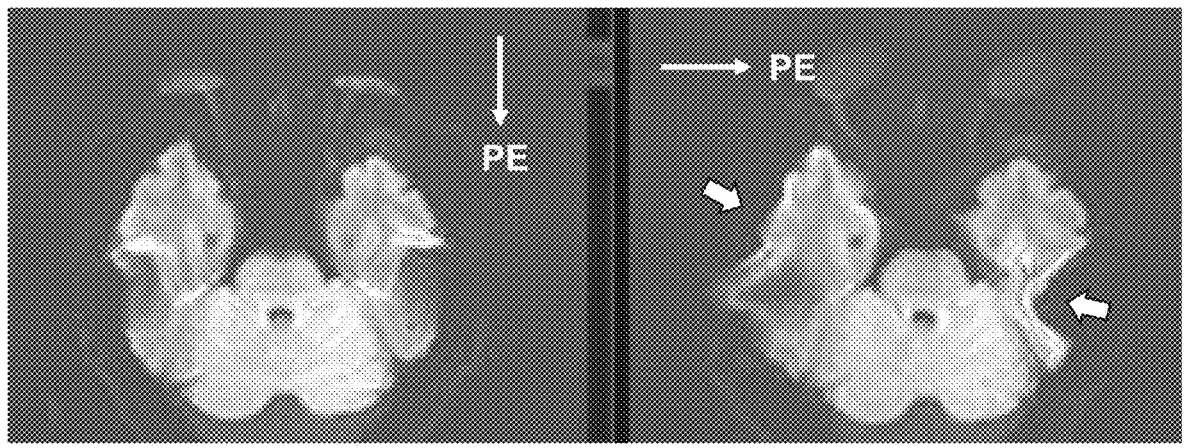

As another example, FIGS. 14A-14D are schematic diagrams illustrating exemplary asymmetric magnetically sensitive artifacts according to some embodiments of the present disclosure. As shown in FIG. 14B and FIG. 14D, when the PE direction is a left-right direction, the MR image of the head of a patient is clearly deformed and distorted (e.g., regions indicated by arrows). As shown in FIG. 14A and FIG. 14C, when the PE direction is an up-down direction, a degree of distortion of the MR image of the head of the patient is reduced.

Figures 15A, 15B:
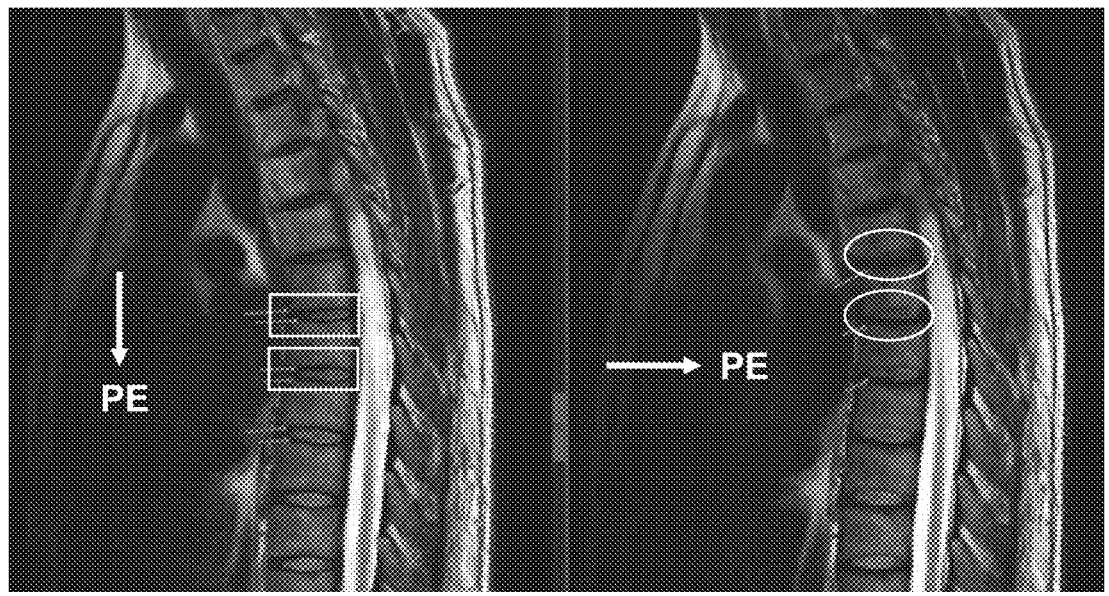
FIGS. 15A-15F are schematic diagrams illustrating exemplary chemical shift artifacts according to some embodiments of the present disclosure.
Figures 15C, 15D:
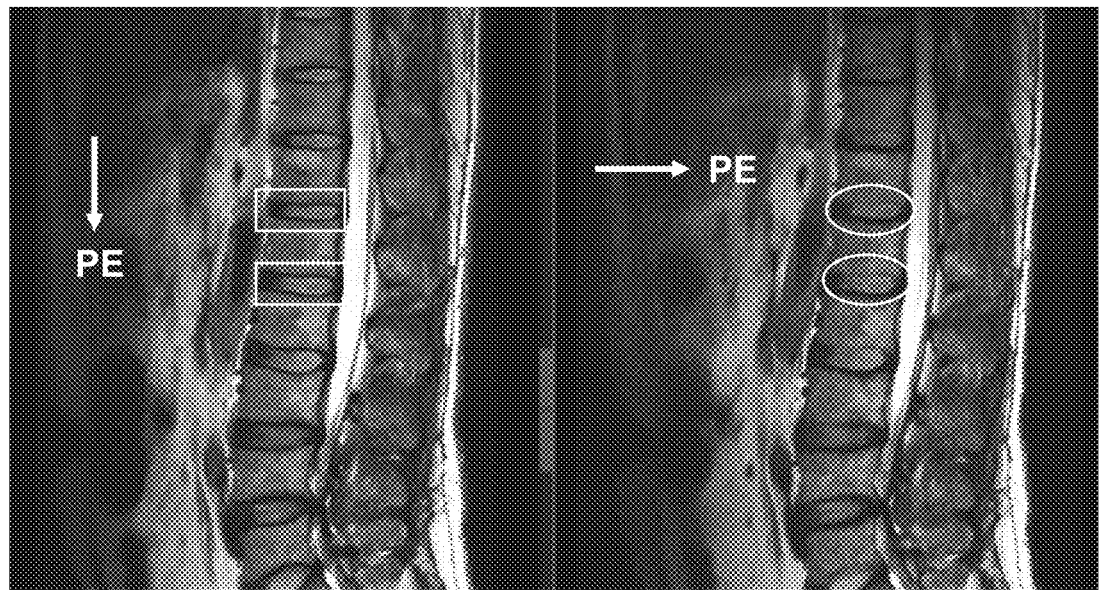
Figure 15E:
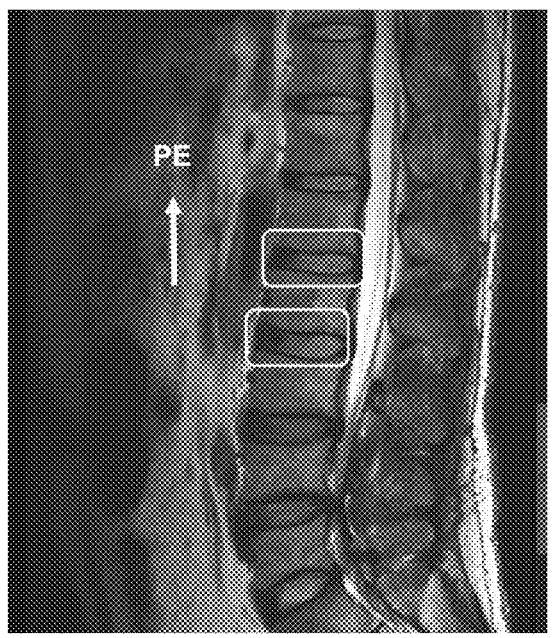
Figure 15F:
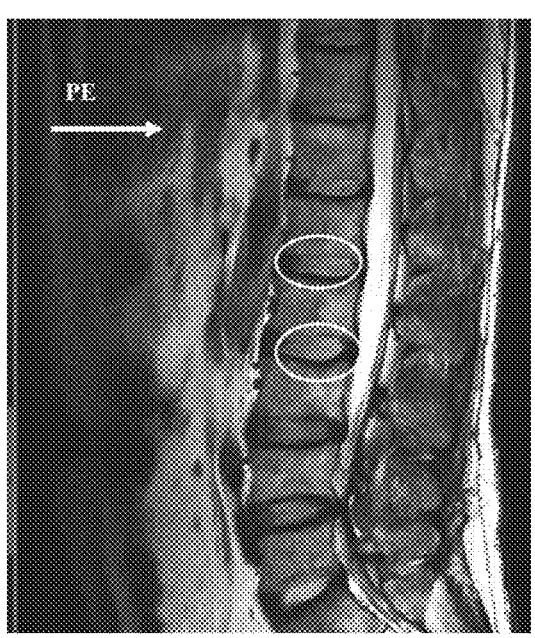

As yet another example, FIGS. 15A-15F are schematic diagrams illustrating exemplary chemical shift artifacts according to some embodiments of the present disclosure. The vertebrae and intervertebral discs are arranged alternately in the thoracic spine. As shown in FIG. 15A, FIG. 15C, and FIG. 15E, when MR imaging is performed based on an appropriate PE direction (e.g., an up-down direction), in the MR image of the thoracic spine, there are black lines along the upper and lower edges of each intervertebral disc (e.g., the anatomical structure in boxes). As shown in FIG. 15B, FIG. 15D, and FIG. 15F, when MR imaging is performed based on an inappropriate PE direction (e.g., a left-right direction), chemical shifts occur in the MR image of the thoracic spine, and only one side of the intervertebral disc has a black line (e.g., the anatomical structure within elliptical circles). In addition, as shown in FIG. 15B, FIG. 15D, and FIG. 15F, the vertebrae are not clear (i.e., slight vertical streak-like artifacts are produced) due to the cerebrospinal fluid motion artifacts and vascular pulsation artifacts of the abdominal artery.

In some embodiments, the processing device 120 may determine the PE direction of the target scan based on a relationship between the second anatomical structure and a candidate anatomical structure, wherein the artifacts will occur in a region of the target MR image corresponding to the candidate anatomical structure. For example, if the second anatomical structure is the candidate anatomical structure, the PE direction may be determined based on based on the imaging effect corresponding to the candidate PE directions. Specifically, the PE direction may be determined by select a candidate PE direction corresponding to the best imaging effect from the candidate PE directions. If the second anatomical structure is a structure near the candidate anatomical structure, the PE direction may be determined based on a relative position of the second anatomical structure with respect to the candidate anatomical structure to avoid that the artifacts of the candidate anatomical structure extend to the second anatomical structure. For example, when the second anatomical structure or most of the second anatomical structure is located above or below the candidate anatomical structure, the processing device 120 may determine the PE direction as a left-right direction. As another example, when the second anatomical structure or most of the second anatomical structure is to the left or right of the candidate anatomical structure, the processing device 120 may determine the PE direction as an up-down direction.

In 1230, in response to determining that no artifacts will occur in the target MR image, the processing device 120 (e.g., the second determination module 330) may designate a preset direction corresponding to a shortest length among lengths of the second anatomical structure in multiple preset directions as the PE direction of the target scan.

Figure 16:
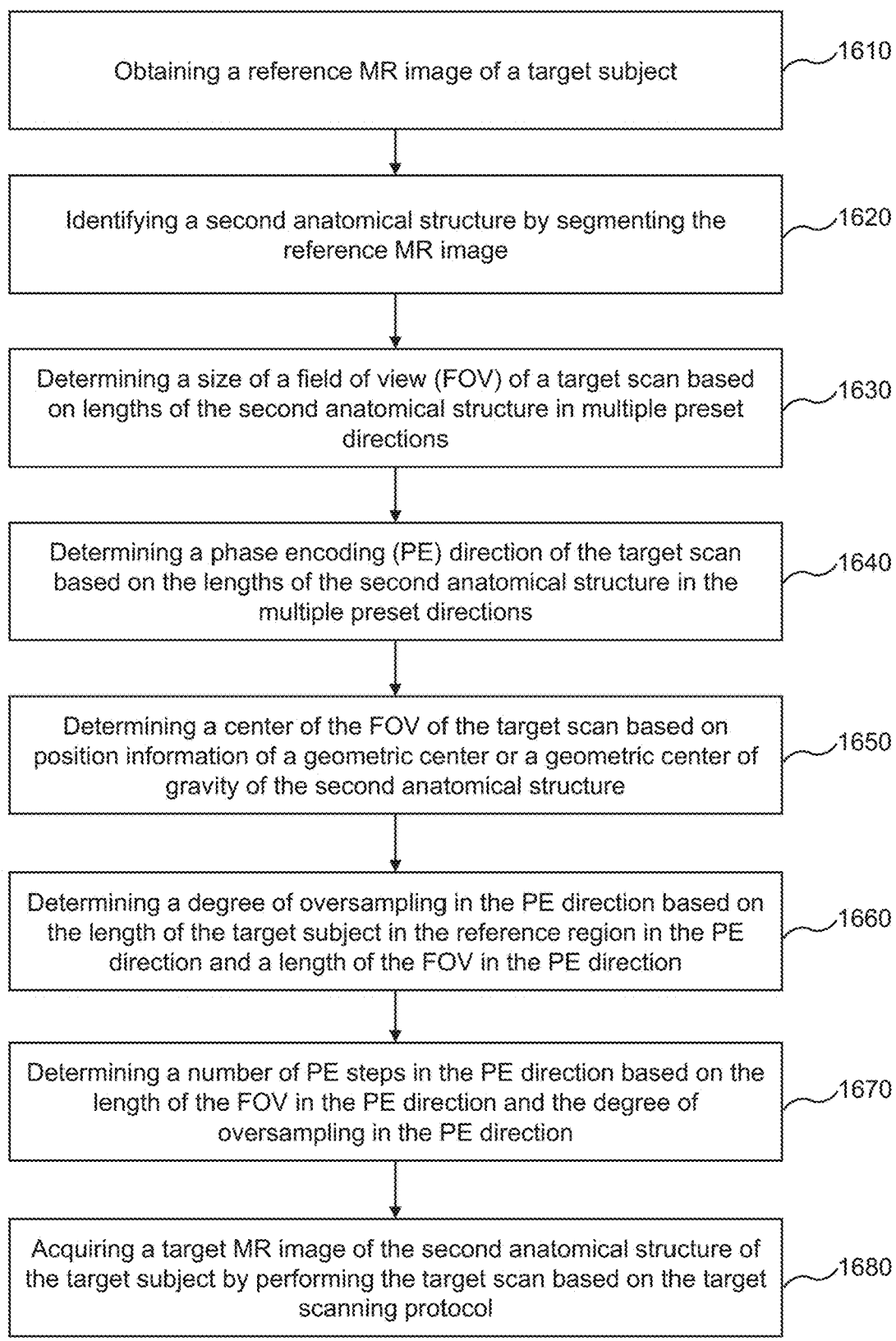
FIG. 16 is a flowchart illustrating an exemplary process for MRI according to some embodiments of the present disclosure.

FIG. 16 is a flowchart illustrating an exemplary process for MRI according to some embodiments of the present disclosure. Process 1600 may be an embodiment of the process 400.

In 1610, the processing device 120 (e.g., the first obtaining module 310) may obtain a reference MR image of a target subject.

In 1620, the processing device 120 (e.g., the first determination module 320) may identify a second anatomical structure by segmenting the reference MR image.

In 1630, the processing device 120 (e.g., the second determination module 330) may determine a size of an FOV of a target scan based on lengths of the second anatomical structure in multiple preset directions.

In 1640, the processing device 120 (e.g., the second determination module 330) may determine a PE direction of the target scan based on the lengths of the second anatomical structure in the multiple preset directions.

In 1650, the processing device 120 (e.g., the second determination module 330) may determine a center of the FOV of the target scan based on position information of a geometric center or a geometric center of gravity of the second anatomical structure.

In 1660, the processing device 120 (e.g., the second determination module 330) may determine a degree of oversampling in the PE direction based on the length of the target subject in the reference region in the PE direction and a length of the FOV in the PE direction.

In 1670, the processing device 120 (e.g., the second determination module 330) may determine a number of PE steps in the PE direction based on the length of the FOV in the PE direction and the degree of oversampling in the PE direction.

In 1680, the processing device 120 (e.g., the second obtaining module 340) may acquire a target MR image of the second anatomical structure of the target subject by performing the target scan based on the target scanning protocol.

Operations 1610-1680 may be performed in a similar manner as that described in connection with FIG. 4, FIG. 10, FIG. 13, and the descriptions thereof are not repeated here.

The operations of the illustrated processes 400, 1200, and 1600 presented above are intended to be illustrative. In some embodiments, a process may be accomplished with one or more additional operations not described, and/or without one or more of the operations discussed. Additionally, the order in which the operations of a process described above is not intended to be limiting.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" may mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on a computing device including at least one processor and at least one non-transitory computer-readable medium, the method comprising:
    obtaining a reference magnetic resonance (MR) image of a target subject, wherein the reference MR image is acquired by performing a reference MR scan on a first anatomical structure of the target subject before a target MR scan, the target MR scan is to be performed on a second anatomical structure of the target subject, the first anatomical structure is chest of the target subject, the second anatomical structure is heart of the target subject, and a resolution for the reference MR scan is lower than a resolution for the target MR scan;
    determining, based on the reference MR image of the target subject, geometrical information of the second anatomical structure of the target subject;
    determining a target scanning protocol with respect to the target MR scan based on the geometrical information of the second anatomical structure of the target subject; and
    acquiring a target MR image of the second anatomical structure of the target subject by performing the target scan based on the target scanning protocol, wherein in the target MR image, the second anatomical structure is not overlapped with other anatomical structures of the target subject.

2. A system, comprising:
    at least one non-transitory computer-readable medium including a set of instructions; and
    at least one processor in communication with the at least one non-transitory computer-readable medium, wherein when executing the set of instructions, the at least one processor causes the system to perform operations including:
        obtaining a reference magnetic resonance (MR) image of a target subject, wherein the reference MR image is acquired by performing a reference MR scan on multiple anatomical structures of the target subject before a target MR scan, the target MR scan is to be performed on a second anatomical structure of the target subject, the second anatomical structure is one of the multiple anatomical structures, and a size of a field of view (FOV) of the reference MR scan is larger than a size of an FOV of the target MR scan;
        determining, based on the reference MR image of the target subject, geometrical information of the second anatomical structure of the target subject;
        determining a target scanning protocol with respect to the target MR scan based on the geometrical information of the second anatomical structure of the target subject; and
        acquiring a target MR image of the second anatomical structure of the target subject by performing the target scan based on the target scanning protocol, wherein in the target MR image, the second anatomical structure is not overlapped with other anatomical structures of the target subject.

3. An MRI system, comprising:
    at least one non-transitory computer-readable medium including a set of instructions; and
    at least one processor in communication with the at least one non-transitory computer-readable medium, wherein when executing the set of instructions, the at least one processor causes the system to perform operations including:
        obtaining a reference magnetic resonance (MR) image of a target subject, wherein the reference MR image includes multiple anatomical structures of the target subject;
        determining a target anatomical structure of the target subject based on the reference MR image of the target subject, the target anatomical structure being one of the multiple anatomical structures of the target subject;
        determining a target scanning protocol by optimizing, based on geometrical information of the target anatomical structure, a scanning protocol to be scanned, wherein a size of a field of view (FOV) for obtaining the reference MR image is larger than a size of an FOV of the target scanning protocol; and
        acquiring a target MR image of the target anatomical structure of the target subject by performing the target scanning protocol, wherein in the target MR image, the target anatomical structure is not overlapped with other anatomical structures of the target subject.

4. The method of claim 1, wherein
    the target MR scan is a 2-dimensional multi-layer MR scan directed to multiple scanning layers, and
    the determining, based on the reference MR image of the target subject, the geometrical information of the second anatomical structure of the target subject includes:
        for each of the multiple scanning layers, generating a multiple planar reconstruction (MPR) image based on position information of the scanning layer and the reference MR image of the target subject;
        determining the geometrical information of the second anatomical structure of the target subject based on MPR images corresponding to the multiple scanning layers.

5. The method of claim 1, wherein the geometrical information of the second anatomical structure of the target subject includes at least one of lengths of the second anatomical structure in multiple preset directions, or position information of a geometric center or a geometric center of gravity of the second anatomical structure.

6. The method of claim 1, wherein the acquiring the target MR image of the second anatomical structure of the target subject by performing the target scan based on the target scanning protocol includes:
    instructing a terminal to display information relating to the target scanning protocol;
    modifying the target scanning protocol based on a modification command received from the terminal; and
    acquiring the target MR image of the second anatomical structure of the target subject by performing the target scan based on the modified target scanning protocol.

7. The system of claim 2, wherein
    the target MR scan is a 2-dimensional multi-layer MR scan directed to multiple scanning layers, and the determining, based on the reference MR image of the target subject, the geometrical information of the second anatomical structure of the target subject includes:
for each of the multiple scanning layers, generating a multiple planar reconstruction (MPR) image based on position information of the scanning layer and the reference MR image of the target subject;
determining the geometrical information of the second anatomical structure of the target subject based on MPR images corresponding to the multiple scanning layers.

8. The system of claim 2, wherein the geometrical information of the second anatomical structure of the target subject includes at least one of lengths of the second anatomical structure in multiple preset directions, or position information of a geometric center or a geometric center of gravity of the second anatomical structure.

9. The system of claim 3, wherein
the optimizing the scanning protocol to be scanned based on the geometrical information of the target anatomical structure includes optimizing first parameters of the scanning protocol to be scanned, the first parameters including at least one of the size of the FOV, a center of the FOV, a phase encoding (PE) direction, or a degree of oversampling in the PE direction,
the MRI system further includes a display configured to display second parameters of the target scanning protocol, the second parameters including the optimized first parameters, or
the display is further configured to display the reference MR image of the target subject, wherein a FOV frame corresponding to the target scanning protocol is set on the reference MR image, and the FOV frame can be adjusted.

10. The method of claim 1, wherein a size of a field of view (FOV) of the reference MR scan is larger than a size of an FOV of the target MR scan.

11. The method of claim 5, wherein the determining the target scanning protocol with respect to the target MR scan based on the geometrical information of the second anatomical structure of the target subject includes:
determining a phase encoding (PE) direction of the target scan based on the lengths of the second anatomical structure in the multiple preset directions.

12. The method of claim 5, wherein the determining the target scanning protocol with respect to the target MR scan based on the geometrical information of the second anatomical structure of the target subject includes:
determining a size of a field of view (FOV) of the target scan based on the lengths of the second anatomical structure in the multiple preset directions.

13. The method of claim 6, wherein the method further includes:
generating a display image indicating the position of an FOV of the target scan with respect to the target subject based on the target scanning protocol, wherein the information relating to the target scanning protocol includes the display image.

14. The system of claim 8, wherein the determining the target scanning protocol with respect to the target MR scan based on the geometrical information of the second anatomical structure of the target subject includes:
determining a phase encoding (PE) direction of the target scan based on the lengths of the second anatomical structure in the multiple preset directions.

15. The system of claim 8, wherein the determining the target scanning protocol with respect to the target MR scan based on the geometrical information of the second anatomical structure of the target subject includes:
determining a center of the FOV of the target scan based on the position information of the geometric center or the geometric center of gravity of the second anatomical structure.

16. The method of claim 11, wherein the determining the PE direction of the target scan based on the lengths of the second anatomical structure in the multiple preset directions includes:
determining whether artifacts will occur in the target MR image;
in response to determining that artifacts will occur in the target MR image, determining the PE direction of the target scan based on the artifacts that will occur in the target MR image; and
in response to determining that no artifacts will occur in the target MR image, designating a preset direction corresponding to the shortest length among the lengths of the second anatomical structure in the multiple preset directions as the PE direction of the target scan.

17. The method of claim 12, wherein the determining the target scanning protocol with respect to the target MR scan based on the geometrical information of the second anatomical structure of the target subject includes:
determining a center of the FOV of the target scan based on the position information of the geometric center or the geometric center of gravity of the second anatomical structure.

18. The system of claim 14, wherein the determining the PE direction of the target scan based on the lengths of the second anatomical structure in the multiple preset directions includes:
determining whether artifacts will occur in the target MR image;
in response to determining that artifacts will occur in the target MR image, determining the PE direction of the target scan based on the artifacts that will occur in the target MR image; and
in response to determining that no artifacts will occur in the target MR image, designating a preset direction corresponding to the shortest length among the lengths of the second anatomical structure in the multiple preset directions as the PE direction of the target scan.

19. The method of claim 17, wherein the determining the target scanning protocol with respect to the target MR scan includes:
determining a reference region in the reference MR image or an MRP image corresponding to each scanning layer of the target MR scan, wherein a length of the reference region in a readout (RO) direction is equal to a length of the FOV in the RO direction, and a center coordinate of the reference region in the RO direction is equal to a center coordinate of the center of the FOV in the RO direction;
determining a length of the target subject in the reference region in a PE direction; and
determining a degree of oversampling in the PE direction based on the length of the target subject in the reference region in the PE direction and a length of the FOV in the PE direction.

20. The method of claim 19, wherein the determining the target scanning protocol with respect to the target MR scan includes:

determining a number of PE steps in the PE direction based on the length of the FOV in the PE direction and the degree of oversampling in the PE direction.

\* \* \* \* \*